United States Patent [19]

Aoki

[11] Patent Number: 5,947,456
[45] Date of Patent: Sep. 7, 1999

[54] VIBRATION INSULATING DEVICE

[75] Inventor: Kazushige Aoki, Isehara, Japan

[73] Assignee: Nissan Motor Co., Ltd., Yokohama, Japan

[21] Appl. No.: 08/725,254

[22] Filed: Oct. 4, 1996

[30] Foreign Application Priority Data

Oct. 6, 1995 [JP] Japan .................................. 7-260317

[51] Int. Cl.$^6$ ................................................. F16F 5/00
[52] U.S. Cl. ............................. 267/140.14; 267/140.13; 267/140.15; 248/550
[58] Field of Search ..................... 267/140.13, 140.14, 267/140.15; 248/550

[56] References Cited

U.S. PATENT DOCUMENTS

| | | | |
|---|---|---|---|
| 4,135,283 | 1/1979 | Kohlhage | 29/173 |
| 4,699,099 | 10/1987 | Arai et al. | 248/550 |
| 5,037,071 | 8/1991 | Takano et al. | 267/140.1 |
| 5,277,409 | 1/1994 | Goto et al. | 267/140.14 |
| 5,356,123 | 10/1994 | Hamada et al. | 267/140.14 |
| 5,601,280 | 2/1997 | Nagaya et al. | 267/140.14 |

FOREIGN PATENT DOCUMENTS

| | | |
|---|---|---|
| 2919697 | 1/1980 | Germany . |
| 3427162 | 1/1986 | Germany . |
| 3501628 | 7/1986 | Germany . |
| 3623282 | 1/1987 | Germany . |
| 3918753 | 7/1990 | Germany . |
| 3-24338 | 2/1991 | Japan . |

*Primary Examiner*—Robert J. Oberleitner
*Assistant Examiner*—Mariano Sy
*Attorney, Agent, or Firm*—Foley & Lardner

[57] ABSTRACT

A fluid sealed type vibration insulating device provided with an actuator for generating an active supporting force. The vibration insulating support device includes a main fluid chamber defined by a cylindrical elastic support and a movable plate connected to a plate spring. The actuator moves the movable plate to change a dynamic spring characteristic and a damping characteristic of a fluid resonance system constituted by a mass of fluid in the orifice, the elastic support, and the plate spring. The plate spring elastically supports the movable plate so that the movable plate is displaced to change the volume of the fluid chamber. The plate spring includes a plurality of rectangular plate spring portions which are radially arranged.

14 Claims, 18 Drawing Sheets

VIBRATION INSULATING DEVICE

BACKGROUND OF THE INVENTION

1. Field of the Invention

The present invention relates to a device for insulating vibrations and supporting a vibration generating means such as an engine of a vehicle, and more particularly to a so-called fluid sealed type vibration insulating device which is arranged to sufficiently decrease a large magnitude vibration input without providing a large and expensive device.

2. Description of the Prior Art

Generally, an engine mount functions as a vibration insulating device in use for supporting a power unit of a vehicle and is mainly required to perform a vibration insulating function relative to vibrations due to idling, booming noises and noises during a vehicle acceleration. However, in order to reduce such idling vibrations, which has a relatively large magnitude ranging from about 20 to 30 Hz, the vibration insulating support device is required to have characteristics of a high dynamic spring constant and a high damping. In contrast, in order to reduce booming (echo sound) vibration and/or acceleration vibrations, which are of a vibration of a relatively small magnitude ranging from about 80 to 800 Hz, the vibration insulating device is required to have characteristics of a low dynamic spring constant and low damping. Accordingly, it is difficult to insulate all vibrations by a normal elastic engine mount or by an engine mount of a conventional fluid sealed type.

A fluid sealed type vibration insulating device, which can generate active supporting force has been proposed so as to adapt to the above mentioned requirements. A Japanese Patent Provisional Publication No. 3-24338 discloses such a fluid sealed type vibration insulating device which is provided with a fluid chamber defined by a supporting elastomer and a moveable plate. The fluid chamber is filled with fluid and is changed in volume by displacing the movable plate through an electromagnetic actuator so as to generate a control force for canceling force transmitted to the vibration insulating device.

However, since such conventional vibration insulating devices have been arranged such that the movable plate is elastically supported through a ring-shaped plate spring, various limitations have been applied to the conventional vibration insulating device. For example, since such a ring-shaped plate spring tends to be high in spring rigidity per unit thickness, an elastically deformable range of the plate spring becomes narrow so as to limit a displacement amount of the movable plate in proportion to a controlled displacement. Also, if the plate spring is formed by a thin plate in order to broaden a proportionally deformable range of the movable plate, durability of the plate spring tends to be degraded.

SUMMARY OF THE INVENTION

It is an object of the present invention to provide an improved vibration insulating device which performs a vibration reducing control applicable to a large vibration input without enlarging the size thereof and without increasing production cost thereof.

A vibration insulating device according to the present invention is interposed between a vibrating means and a structural member. The vibration insulating device comprises a main fluid chamber, an elastic support, fluid, a movable plate, an electromagnetic actuator, and an elastic plate. The elastic support partly defines the main fluid chamber filled in the fluid. The movable plate partly defines the fluid chamber and is made of magnetizable material. The electromagnetic actuator generates displacement force for displacing the movable plate. The elastic plate elastically supports the movable plate so that the movable plate is displaced to change the volume of the fluid chamber. The elastic plate includes a plurality of rectangular plate spring portions which are radially arranged. The elastic plate is supported to a supporting member for supporting the electromagnetic actuator.

BRIEF DESCRIPTION OF THE DRAWINGS

In the drawings, like reference numerals designate like parts and elements throughout all figures, in which.

DETAILED DESCRIPTION OF THE INVENTION

Referring to FIGS. 1 to 5, there is shown a first embodiment of a vibration insulating device according to the present invention.

Figure 1:
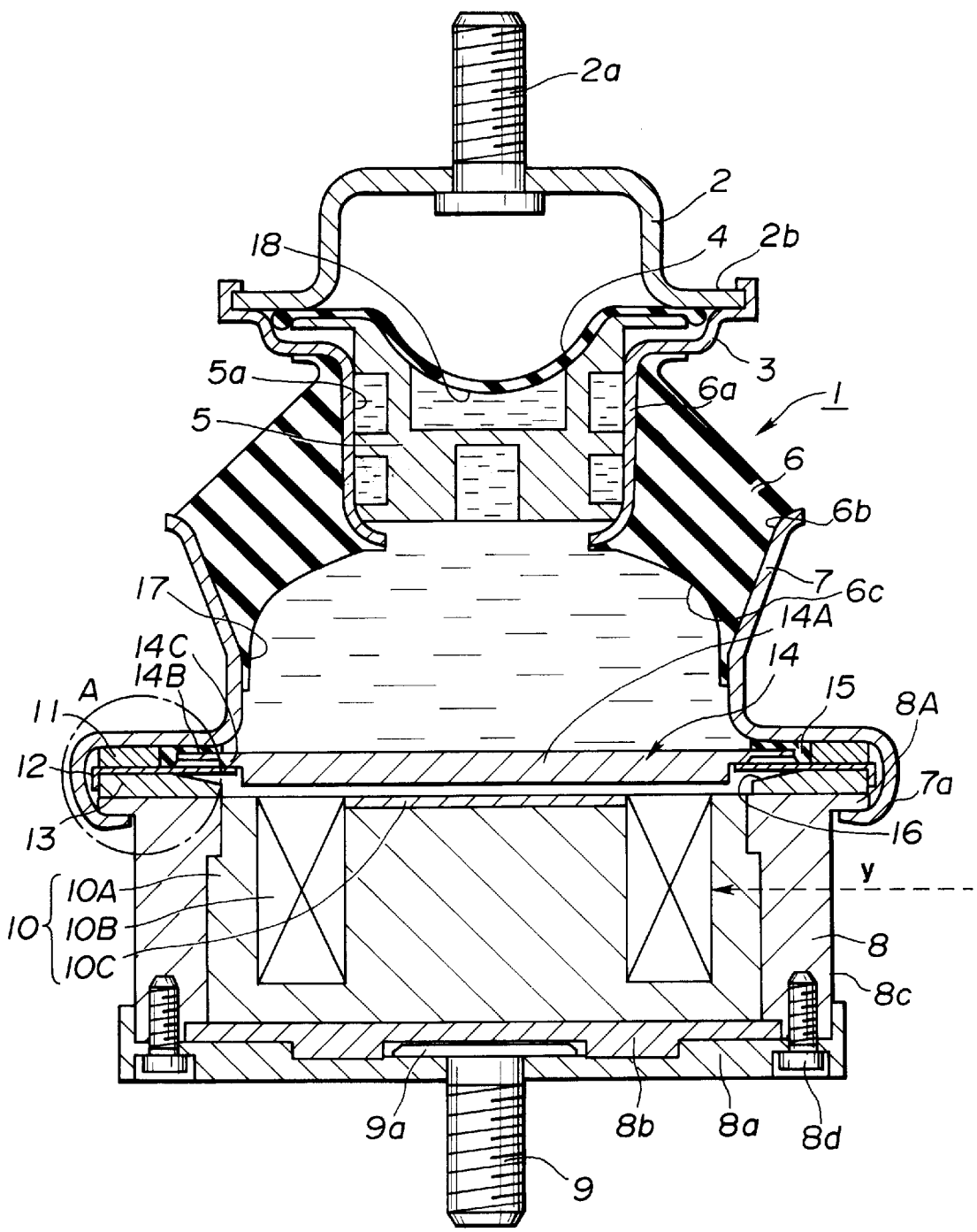
FIG. 1 is a cross-sectional view which shows a structure of a first embodiment of a vibration insulating device according to the present invention.
Figure 2:
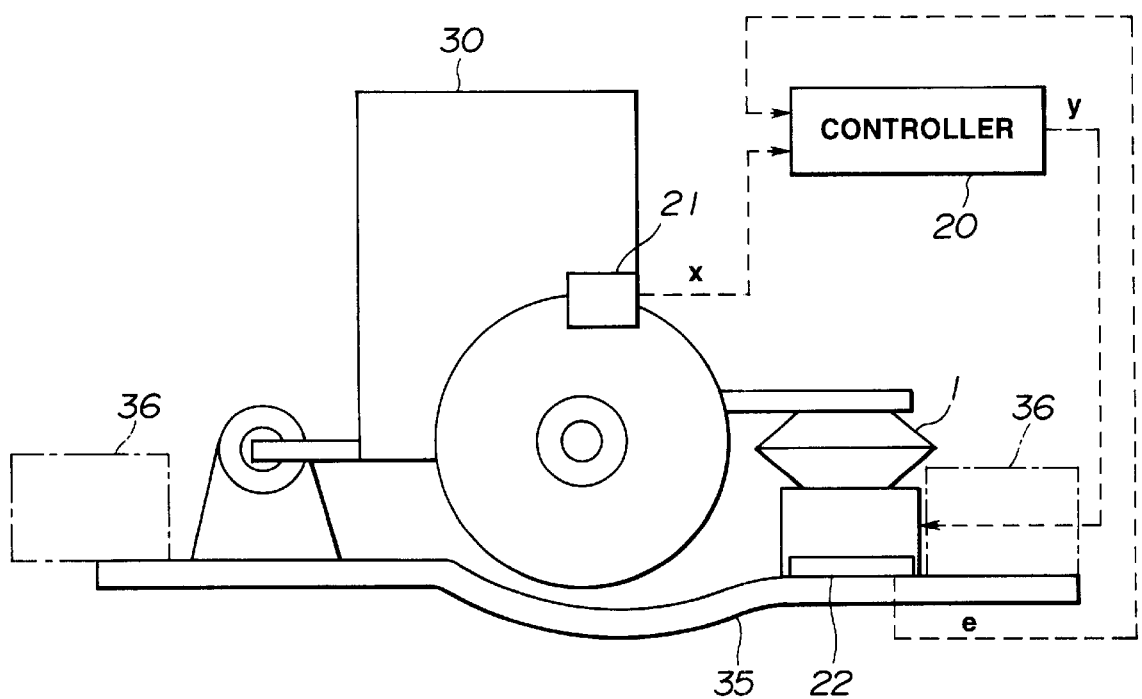
FIG. 2 is a whole structural view which shows an equipped condition of the first embodiment.

FIG. 1 shows the first embodiment of the vibration insulating device which is applied to a so-called active engine mount 1. The engine mount 1 is arranged to actively decrease vibrations transferred from an engine 30 to a supporting member (or structural member) 35 fixed to a vehicle body, as shown in FIG. 2. The engine mount 1 is of a fluid sealed type and an electromagnetic drive type. The engine mount 1 comprises an installation bolt 2a through which the engine mount 1 is connected with the engine 30. Integrally connected with the installation bolt 2a is an installation part 2 formed into a cup-shape. The installation part 2 forms a hollow by its inner surface and has an open round periphery 2b. The open round periphery 2b of the installation part 2 is caulked with an upper end portion of an inner cylinder 3.

A diaphragm 4 is disposed inside of the inner cylinder 3 so as to divide an inner space defined by the installation part 2 and the inner cylinder 3 into upper and lower parts. An outer periphery of the diaphragm 4 is clamped between the installation part 2 and the inner cylinder 3 by means of a caulking. An orifice construction part 5 is disposed in the inner cylinder 3 and under the diaphragm 4.

A supporting elastomer 6 of a generally cylindrical shape is formed such that the inner surface 6a is higher than an outer surface 6b in height level along the axial direction. The inner surface 6a of the supporting elastomer 6 is valcanizedly connected with an outer surface of the inner cylinder 3. The outer surface 6b of the supporting elastomer 6 is valcanizedly connected with an inner surface of an outer cylinder 7.

A lower end portion 7a of the outer cylinder 7 is caulked with a flange portion 8A of an actuator case 8. The actuator case 8 is constituted by a cylinder portion 8c, a bottom plate 8a fixedly connected with the cylinder portion 8c by means of a plurality of bolts 8d and a flat plate 8b disposed inside of the bottom plate 8a so as to be formed into a cup-shape which is cylindrical and upwardly opened. An installation bolt 9 for installing the engine mount 1 to the structural member 35 is projected from a lower end surface of the actuator case 8. A head portion 9a of the installation bolt 9 is received by the flat plate 8b and fixed by the bottom plate 8a.

Furthermore, an electromagnetic actuator 10 is fittingly disposed in the actuator case 8. The electromagnetic actuator 10 is constituted by a cylindrical yoke 10A which is fixed to an upper surface of the flat plate 8b so as to be coaxial with the actuator case 8, an exciting coil 10B which is a circular coil wound round the vertical axis in the yoke 10A, and a permanent magnet 10C which is fixed to an upper surface of a part surrounded by the exciting coil 10B so as to form a polarity in the vertical direction.

Figure 3:
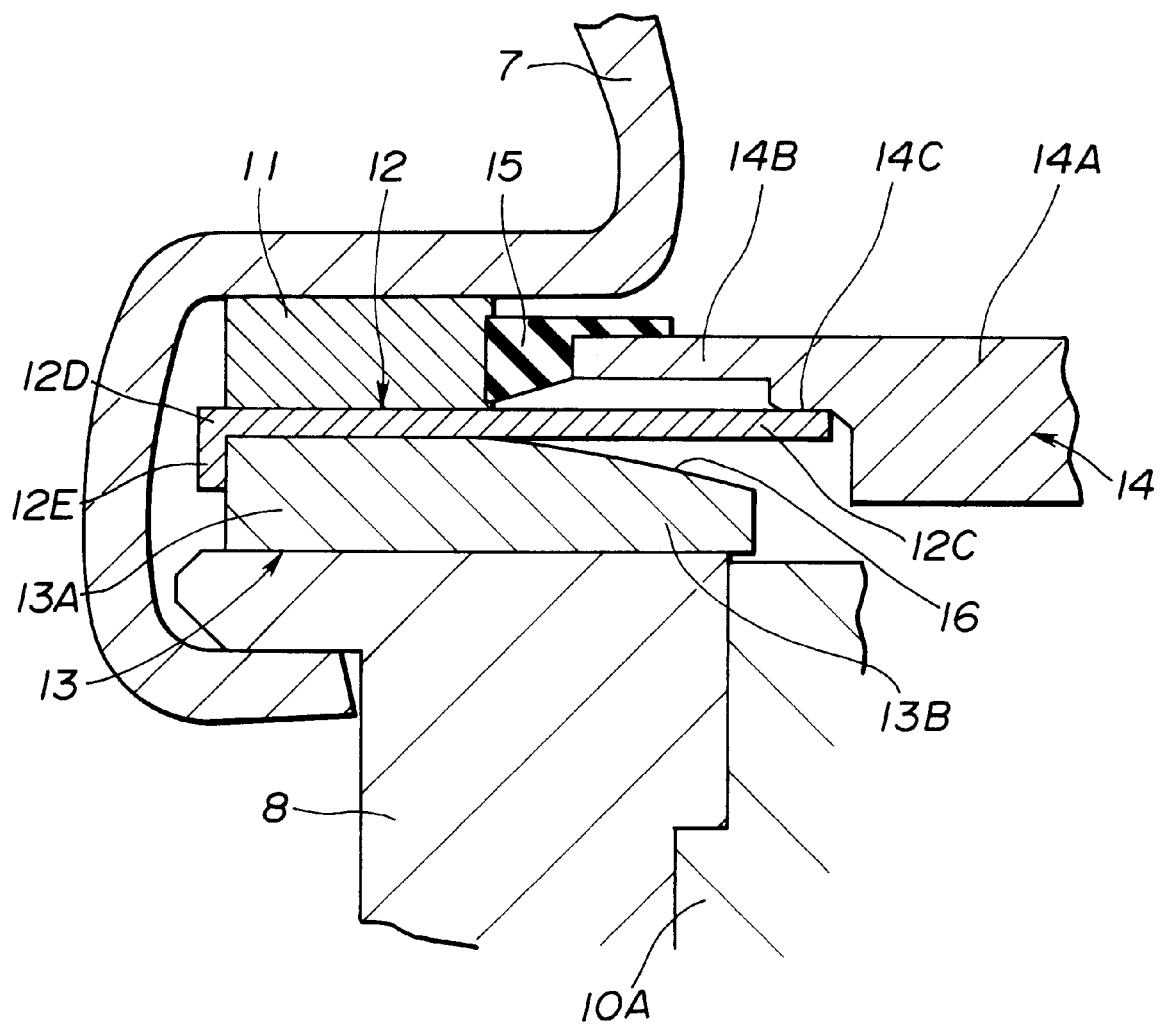
FIG. 3 is an enlarged view of part of FIG. 1.
Figure 4:
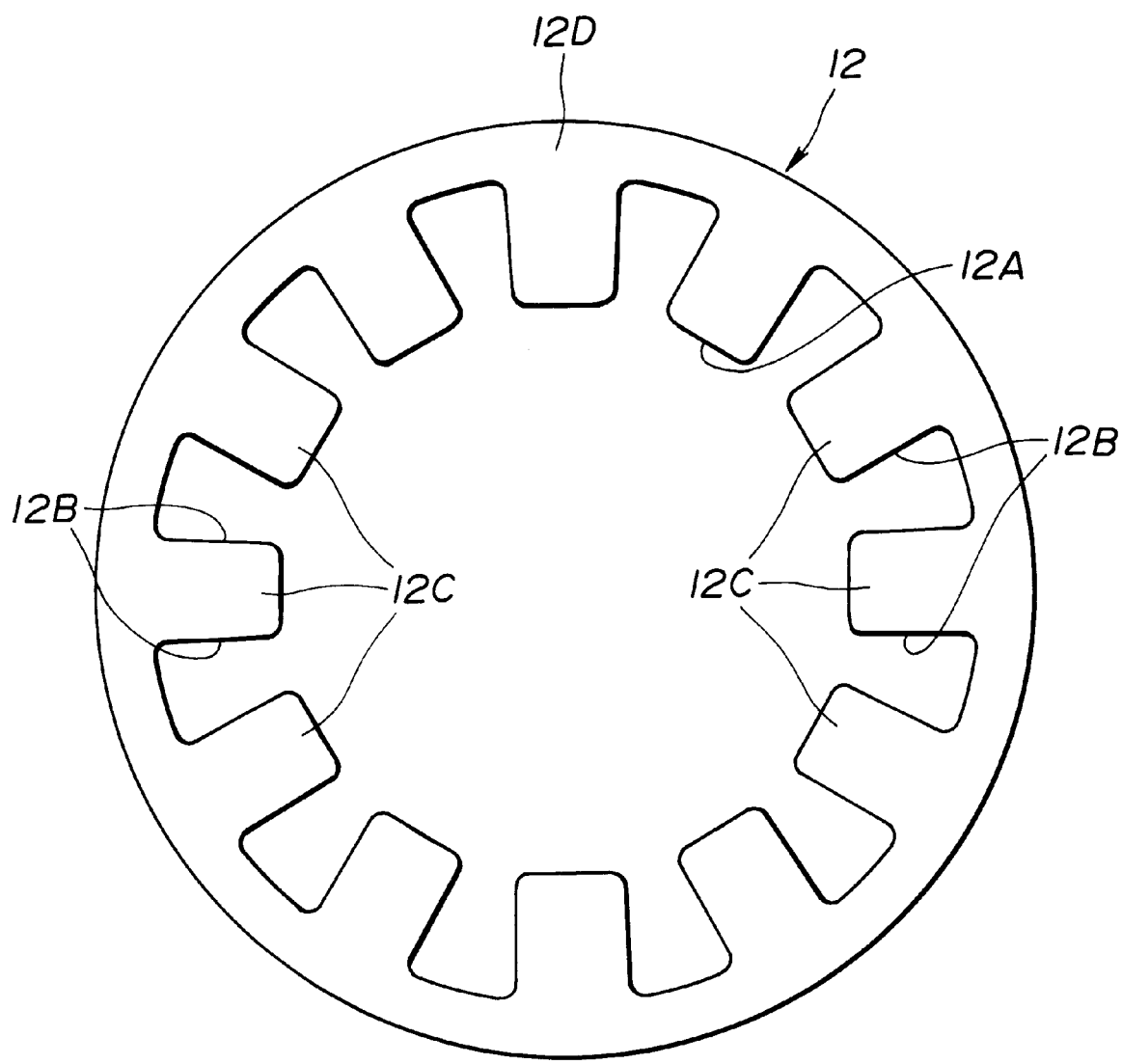
FIG. 4 is a plan view of a plate spring used in the first embodiment.

As shown in FIG. 3 which is an enlarged view of A of FIG. 1, a ring member 11 of a rectangular cross-section, a plate spring 12 functioning as an elastic member, and a ring-shaped supporting member 13 are clumped between the outer cylinder 7 and the actuator case 8. The plate spring 12 is formed into a shape shown in FIG. 4. An opening 12A is formed at a center of the plate spring 12 of a disc shape. A plurality of slits 12B are formed around the center opening 12A so as to radially extend outward. Therefore, the plate spring 12 is constituted by a plurality of plate spring portions 12C defined by the slits 12B and a ring portion 12D as shown in FIG. 4. An outer periphery of the ring portion 12D is bent to form a L-shape cross-section and to define a bent end portion 12E as shown in FIG. 3. The bent end portion 12E is in contact with an outer periphery of the supporting member 13. The ring portion 12D and outer end portions of the plate spring portions 12C are sandwiched between the ring member 11 and the supporting member 13 so that the plate spring 12 is fixed between the ring member 11 and the supporting member 13. That is, the ring portion 12D is connected to the actuator case 8 through the supporting member 13 while being sandwiched between the ring member 11 and the supporting member 13.

A disc-shaped movable plate 14 functioning as a movable plate is made of a magnetizable material such as iron. The movable plate 14 is disposed inside of the plate spring 12 above the electromagnetic actuator 10 so as to cover an opening portion side of the actuator case 8. More particularly, the movable plate 14 is constituted by a main body 14A including a relatively thick disc, a flange portion 14B which is formed in the vicinity of an upper surface (facing to the orifice structural member 5) of the main body 14A and a projecting portion 14C which is formed at a lower surface (facing electromagnetic actuator 10) of the flange portion 14B. An outer periphery of the flange portion 14B is connected with an inner periphery of the ring member 11 through a seal member 15. The projecting portion 14C of the movable plate 14 is in contact with free end portions of the plate spring portions 12C.

The supporting member 13 of a ring shape is formed such that an outer diameter thereof is generally the same as that of the ring member 11 and an inner diameter thereof is smaller than that of the ring member 11. The difference between the outer diameter and the inner diameter of the supporting member 13 is generally twice that of the ring member 11. The supporting member 13 has a flat portion 13A at which the plate spring 12 is sandwiched and a tapered portion 13B which is tapered toward the center thereof. The tapered portion 13B has a supporting surface 16 at which the plate spring portions 12C are received when the plate spring portions 12C are bent in some degree toward the supporting member 13.

Furthermore, a main fluid chamber 17 is defined by a lower surface 6c of the supporting elastomer 6 and an upper surface of the movable plate 14. An auxiliary fluid chamber 18 is defined by the diaphragm 4 and the orifice construction member 5. The orifice 5a formed by the orifice construction member 5 provides fluid communication between the main chamber 17 and the auxiliary fluid chamber 18. The main fluid chamber 17, the auxiliary chamber 18 and the orifice 5a are filled with fluid such as oil.

The fluid resonance system constituted by a mass of fluid in the orifice 5a, an extension-direction spring of the supporting elastomer 6 and the plate spring 12 is adjusted so that a damping peak frequency (a frequency at which damping becomes maximum) during a non-controlled period (when drive current is not supplied to the exciting coil 10B of the electromagnetic actuator 10) corresponds to a frequency of an idling vibration generated during a stopping of the vehicle.

The exciting coil 10B of the electromagnetic actuator 10 is electrically connected through a harness (not shown) with a controller 20 functioning as an electromagnetic actuator controlling means. The exciting coil 10B generates predetermined magnetic force according to a drive signal y supplied from the controller 20. The controller 20 includes a micro-computer, various interface circuits, an A/D converter, a D/A converter and an amplifier. When the controller 20 detects that the engine 30 is generating the idle vibration or high-frequency vibrations such as that of booming noise (echo sound) vibration, the controller 20 generates a control vibration and supplies it to the engine mount 1 so that the vibration generated by the engine 30 is not transferred to the structural member 35, more specifically so that exciting force inputted to the engine mount 1 due to the vibration of the engine 30 is canceled by the control force generated by the electromagnetic force of the electromagnetic actuator 10.

When the engine mount 1 is applied to a reciprocated four cylinder engine, idle vibrations and booming (echo) vibrations are mainly caused by a transmission of engine vibrations of a second component of the engine rotation through the engine mount 1 to the structural member 35. Accordingly, it is possible to reduce the vibration transmitting ratio by generating and outputting the drive signal y upon synchronizing the signal y with the secondary component of the engine rotation.

A pulse signal generator 21 is connected to the engine 30 and is electrically connected with the controller 20. The pulse signal generator 21 generates an impulse signal synchronized with the rotation of a crankshaft of the engine 30, for example, once for each 180° rotation of the crankshaft in the case of the reciprocated four cylinder engine, and outputs the impulse signal as a reference signal x. The reference signal x is supplied to the controller 20 as a signal representative of a vibration generating condition at the engine 30. An acceleration sensor 22 is fixedly installed to the structural member 35 in the vicinity of the connecting portion of the engine mount 1. The acceleration sensor 22 detects a vibration condition of the structural member 35 in the form of an acceleration and outputs a corresponding residual vibration signal e. The residual vibration signal e is supplied to the controller 20 as a signal representative of a vibration after the interference by the engine mount 1.

The controller 20 generates and outputs the drive signal y on the basis of the reference signal x and the residual vibration signal e according to the Filtered-X LSM algorithm, more particularly to the synchronized Filtered-X LSM algorithm. That is, the controller 20 includes an adaptive digital filter W which variably changes a filter coefficient $W_i$ where i=0, 1, 2, ..., I-1, and I is a number of tap. By each predetermined sampling-clock interval from a time the newest reference signal x is inputted, the filter coefficient $W_i$ of the adaptive digital filter W is in turn outputted as a drive signal y, and an appropriate updating process of the filter coefficient $W_i$ of the adaptive digital filter W is executed according to the reference signal x and the residual vibration signal e so as to reduce the vibration transmitted from the engine 30 to the engine mount 1 through the member 35.

An updating equation of the adaptive digital filter W is represented by the following equation (1) based on the Filtered-X LMS algorithm.

$$W_i(n+1) = W_i(n) - \mu R^T e(n) \tag{1}$$

wherein a term including (n) represents a value at time n, m is a coefficient called a convergence coefficient and related to the converging speed of the filter coefficient Wi and its stability. $R^T$ is, theoretically, a Filtered-X signal obtained by filter-processing the reference signal x by means of a model transfer function filter C^ which is a model of a transfer function C between the force generated at the electromagnetic actuator 10 and the acceleration sensor 22. The reference signal x is an impulse-train as a result of the application of the synchronized-type Filtered-X LMS algorithm. Accordingly, in the case that impulse responses of the transfer function filter C^ are in turn generated synchronously with the reference signals x, $R^T$ corresponds to the sum of these impulse response wave forms at the time n.

Theoretically, the drive signal y is generated by filtering the reference signal x by means of the adaptive digital filter W, and this filtering process corresponds to a convolution calculation in the digital calculation. Since the reference signal x is an impulse train, by outputting each filter coefficient $W_i$ of the adaptive digital filter W as a drive signal y in turn at predetermined sampling-clock intervals from a time that the newest reference signal x is inputted, the same result is obtained as in a case that the result of the filter process is taken as a drive signal y.

Figure 5:
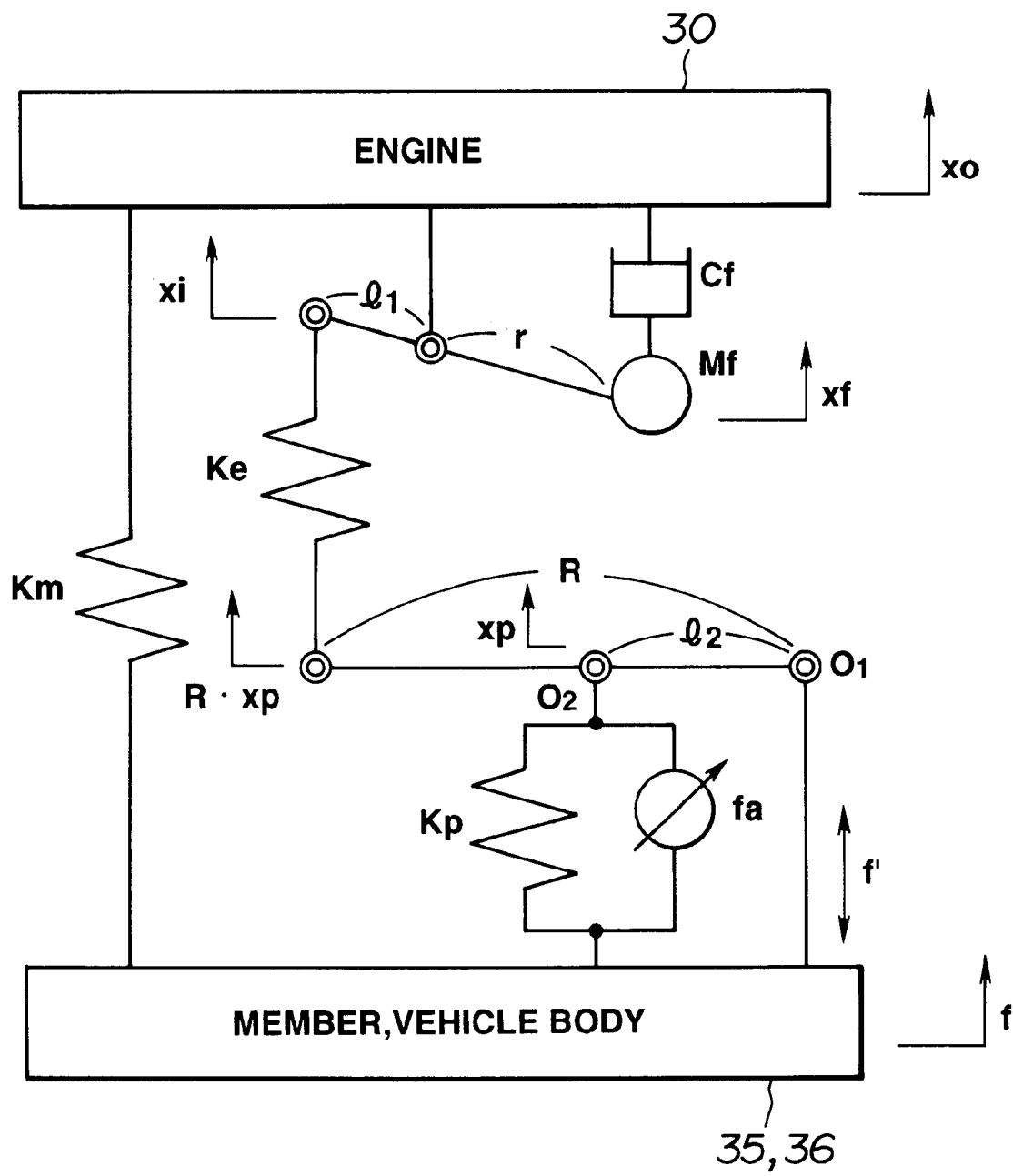
FIG. 5 is a model view of the vibration insulating device according to the present invention.

FIG. 5 shows a model of the engine mount 1 of the first embodiment according to the present invention. In FIG. 5, $M_f$ is a mass [kg] of the fluid in the orifice 5a, $C_f$ is a fluid viscosity damping coefficient, $K_m$ is a supporting-directional spring constant [N/m] of the supporting elastomer 6, $K_e$ is an expanding-directional spring constant [N/m] of the supporting elastomer 6, $K_p$ is a spring constant [N/m] of a plate spring 12, $f_a$ is a controlling force applied to the movable plate 14 by the electromagnetic actuator 10, $x_0$ is a displacement [m] inputted from the engine 30 to the engine mount 1, $X_f$ is a displacement of the fluid in the orifice 5a, $x_1$ is a displacement [m] at an upper portion of an expanding-directional spring of the supporting elastomer 6, $x_p$ is a displacement [m] of the movable plate 14, $f^1$ is a fulcrum reaction force [N], f is a transmission force [N] to the structural member 35, R is a ratio ($A_p/A_u$) between an effective pressure receiving area $A_u$ [m$^2$] of the expanding-directional spring of the supporting elastomer 6 and an effective pressure receiving area $A_P$ [m$^2$] of the movable plate 14, and r is a ratio ($A_u/A_O$) between the effective pressure receiving area $A_u$ and the pressure receiving area $A_O$ of a hole of the orifice 5a.

The manner of operation of the first embodiment of the vibration insulating device according to the present invention will be discussed hereinafter.

When the engine 30 is shaken, the engine mount 1 functions as a supporting device providing a high spring constant and a damping force due to the proper selection of the orifice 5a. Accordingly, the shaking of the engine 30 is damped by the engine mount 1, and the magnitude of the vibration level to the member 35 is decreased. In such a case, it is not necessary to displace the movable plate 14.

On the other hand, when the controller 20 detects the vibration of the engine 30 which vibration has a frequency higher than the idle vibration frequency, the controller 20 executes a predetermined calculation process and outputs the drive signal y to the electromagnetic actuator 10. That is, positive controlling force is generated in the engine mount 1 in order to reduce the vibration of the engine at the engine mount 1. This will be discussed in detail with reference to a flowchart of FIG. 6. One-cycle processing is executed synchronously with the reference signals x of an impulse train, and one sampling processing is executed synchronously with a clock-pulses of predetermined time intervals which are started at an input timing of the reference signal x.

First, at a step S101 a predetermined initialization of the controller 20 is executed. Then, the routine proceeds to a step S102 wherein a transfer function filter C^ stored in the predetermined memory of the controller 20 is read out.

At a step S103, a counter i for counting the number of output times of the drive signals y per one cycle is cleared. Then, the routine proceeds to a step S104.

At the step S104, the controller 20 outputs the calculated drive signal y to the exciting coil 10B of the electromagnetic actuator 10.

Next, the routine proceeds to a step S105 wherein the controller 20 reads in the residual vibration signal e. Following this, the routine proceeds to a step S106 wherein the controller 20 calculates a reference signal $R^T$ for update by filtering the reference signal x through the transfer function filter $C^\wedge$ as mentioned above.

In a step S107, the controller 20 clears a counter j to 0. The counter j is a counter for judging as to whether the updating calculation of the filter coefficient Wi of the adaptive digital filter W has been executed the necessary number of times or not.

In a step S108, the controller 20 updates the filter coefficient Wj of the adaptive digital filter W according to the above equation (1). After the execution of the updating process at the step S108, the routine proceeds to a step S109 wherein the controller 20 decides whether the next reference signal x is inputted or not. When the controller 20 decides that the reference signal x is not inputted, the routine proceeds to a step S110 in order to execute an updating of next filter coefficient of the adaptive digital filter W or output processing of the drive signal y.

In the step S110, the controller 20 decides whether or not the counter j is greater than a maximum sampling number Tap which is obtained by dividing a maximum cycle of the reference signal x determined by the minimum rotation number of the engine 30 by the sampling clock. Since the counter j starts from 0, the counter j is compared with the a value (Tap−1) subtracting 1 from the maximum sampling number Tap. This decision is executed for deciding whether or not the filter coefficient Wj of the adaptive digital filter W is updatedby necessary numbers after the output of the drive signal y based on the filter coefficient Wi at the step S104. When the decision in the step S110 is "NO", the routine proceeds to a step S111 wherein the counter j is incremented (j=j+1). Then the routine is returned to the step S108 wherein the above-mentioned processing is again executed. When the decision in the step S110 is "YES", that is, when it is decided that the filter coefficient of the adaptive digital filter W is updated by the necessary numbers, the routine proceeds to a step S112.

In the step S112, a DC component is eliminated from a sequence of numbers constituted by the filter coefficient Wi. Then, the routine proceeds to a step S113 wherein the controller 20 decides whether either of the filter coefficients Wi is greater than the upper limit value $W_{max}$ or not. When it is decided that none of them is greater than the upper limit value $W_{max}$, the routine proceeds to a step S114 wherein the correction coefficient β is set at 1. On the other hand, when it is decided that either of them is greater than the upper limit value $W_{max}$, the routine proceeds to a step S115 wherein the correction coefficient β is set a number which is greater than 0 and smaller than 1. More definitely, at the step S115, the correction coefficient β is set so that the multiple of the correction coefficient β and each filter coefficient Wi is smaller than the upper limit value $W_{max}$ and takes a possibly near value to the upper limit $W_{max}$. Then, the routine proceeds to a step S116 wherein the correction coefficient β is multiplied by each filter coefficient Wi and each filter coefficient Wi is replaced by the multiplied result.

The processing in the steps S112 to S116 is executed to prevent the following trouble. That is, if the drive signal y is generated by using the filter coefficient Wj updated at the step S108 as it is, in the case that the outputable drive signal y has an upper limit on the viewpoint of the characteristic of the controller 20 and the electromagnetic actuator 10 and the like, the drive signal y greater than the upper limit value is forcibly corrected to the upper limit value and the drive signal y smaller than the upper limit value is outputted as it is. Accordingly, a high-frequency component, which does not exist practically, is convoluted and this degrades the vibration reducing control. Consequently, by executing the processing in the steps S112 to S116, even in case that the drive signal y becomes greater than the upper limit value, all of the drive signals y are decreased in the same manner to correct only their levels. Therefore, the convolution of the unnecessary high-frequency component is easily prevented.

After the execution of the processing in the step S116, the routine proceeds to a step S117 wherein the counter i is incremented. Then, until a time corresponding to the predetermined sampling clock interval from the execution of the processing in the step S104 has elapsed, the routine is awaited. When the time corresponding to the sampling clock has elapsed, the routine returns to the step S104 wherein the above-mentioned processing is repeatingly executed.

When it is decided in the step S109 that the reference signal x is inputted, the routine returns to the step S103 to repeat the above-mentioned processing.

As a result of that the repeated execution of such processing, the filter coefficient Wi of the adaptive digital filter W is in turn supplied as the drive signal y from the controller 20 to the electromagnetic actuator 10 of the engine mount 1 at predetermined sampling-clock intervals from a time the reference signal x is inputted. As a result, although the magnetic force corresponding to the drive signal y is generated at the exciting coil 10B, the predetermined magnetic force due to the permanent magnet 10C has already been applied to the movable plate 14. Therefore, it may be considered that the magnetic force due to the exciting coil 10B functions to strengthen or weaken the magnetic force of the permanent magnet 10C. That is, in a condition that the drive signal y is not supplied to the exciting coil 10C, the movable plate 14 is displaced at a neutral position where the supporting force of the plate spring 12 and the magnetic force of the permanent magnet 10C are balanced. When the drive signal y is supplied to the exciting coil 10B in this neutral condition, the movable plate 14 is displaced in the direction that the clearance relative to the electromagnetic actuator 10 is increased if the magnetic force generated at the exciting coil 10B by the drive signal y is directed against the direction of the magnetic force of the permanent magnet 10C. Inversely, if the direction of the magnetic force generated at the exciting coil 10B is the same as that of the magnetic force of the permanent magnet 10C, the movable plate 14 is displaced so that the clearance relative to the electromagnetic actuator 10 is decreased.

Thus, the movable plate 14 is movable in the right and inverse directions. Since the volume of the main fluid chamber 17 is changed by the displacement of the movable plate 14 and the expansion spring of the supporting elastomer 6 is deformed due to this volume change, the supporting force active in the right and inverse directions is generated at the engine mount 1. Each filter coefficient Wi of the adaptive digital filter W is in turn updated by the equation (1) according to the synchronized type Filtered-X LMS algorithm. Therefore, after each filter coefficient Wi of the adaptive digital filter W is converged into an optimum value after a predetermined time has elapsed, the idle vibration and the booming (echo) noises transferred from the engine 30 through the engine mount 1 to the structural member 35 are decreased by supplying the drive signal y to the engine mount 1.

The engine mount 1 is arranged to form a clearance gap between the electromagnetic actuator 10 and the movable plate 14 so as to be smaller than 3 mm. The suction force (controlling force) of the electromagnetic actuator 10 is changed within a range from several kgf to one hundred several tens kgf although the clearance gap is very small as mentioned above.

Figure 6:
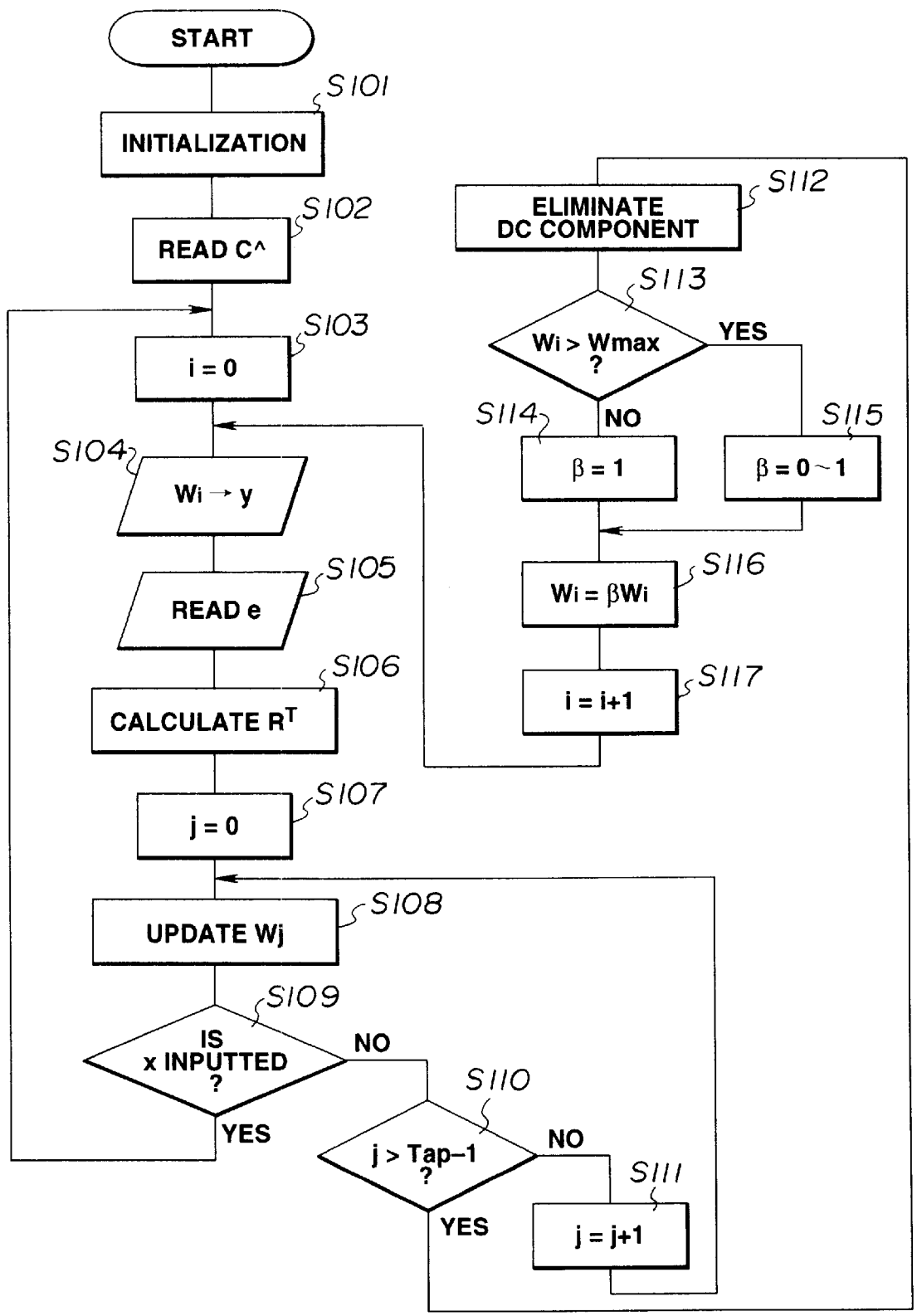
FIG. 6 is a flowchart which shows processing executed in a controller of the first embodiment.

On the other hand, during the control by executing the operation shown in FIG. 6, the vibration displacement input to the engine mount 1 becomes maximum when the idling of the engine is set in a minimum rotation speed. If a diesel engine or large cubic-capacity gasoline-engine is mounted on the engine mount 1, the vibration displacement input to the engine mount 1 becomes 0.4 to 1.0 mm in vibration amplitude. Therefore, it is necessary to displace the movable plate 14 by a large vibration amplitude the same as the vibration displacement input in order to fully cancel the transferred force to the structural member 35. In such situation, the movable plate 14 is displaced by 1 to 2 mm in high and low vibration amplitude. Since such displacement of the movable plate 14 causes the electromagnetic actuator 10 to change within a range from several kgf to a hundred several tens kgf, it is necessary that the plate spring 12 elastically supporting the movable plate 14 have spring force which can change within the range the same as that of the electromagnetic actuator 10.

Further, the engine mount 1 is normally formed to be 100 mm in a maximum outer diameter due to the limitation in the space of the vehicle. Accordingly, it is necessary that the plate spring 12 supporting the movable plate 14 of the engine mount 1 can be disposed in a limited space and can largely change its spring characteristic even by a micro-displacement. This requires a detailed design of the plate spring 12 as to the spring characteristic. However, according to the arranged engine mount 1 according to the present invention, such spring characteristic is achieved in higher level.

That is, in the engine mount 1 expressed by the model shown in FIG. 5, it is assumed that the movable plate 14 is displaced by $x_p$ in order to fully cancel the transmission of the force to the structural member 35 by using the control force $f_a$ of the electromagnetic actuator 10 in case that an input displacement $x_0$ is applied from the engine 30 to the engine mount 1. A spring constant ($f_a/x_p$) of a movable plate compound spring, which is an apparent spring of the movable plate 14, is expressed by a combination of the plate spring 12 and an additional spring element, as represented by the following equation (2).

$$f_a/X_p = K_p + \{R^2 K_m K_e/(K_m + K_e)\} \quad (2)$$

On the other hand, a relationship represented by the equation (3) is established between the displacement $x_p$ of the movable plate 14 and the input displacement $x_0$.

$$x_0/x_p = RK_m/(K_m + K_e) \quad (3)$$

Figure 7:
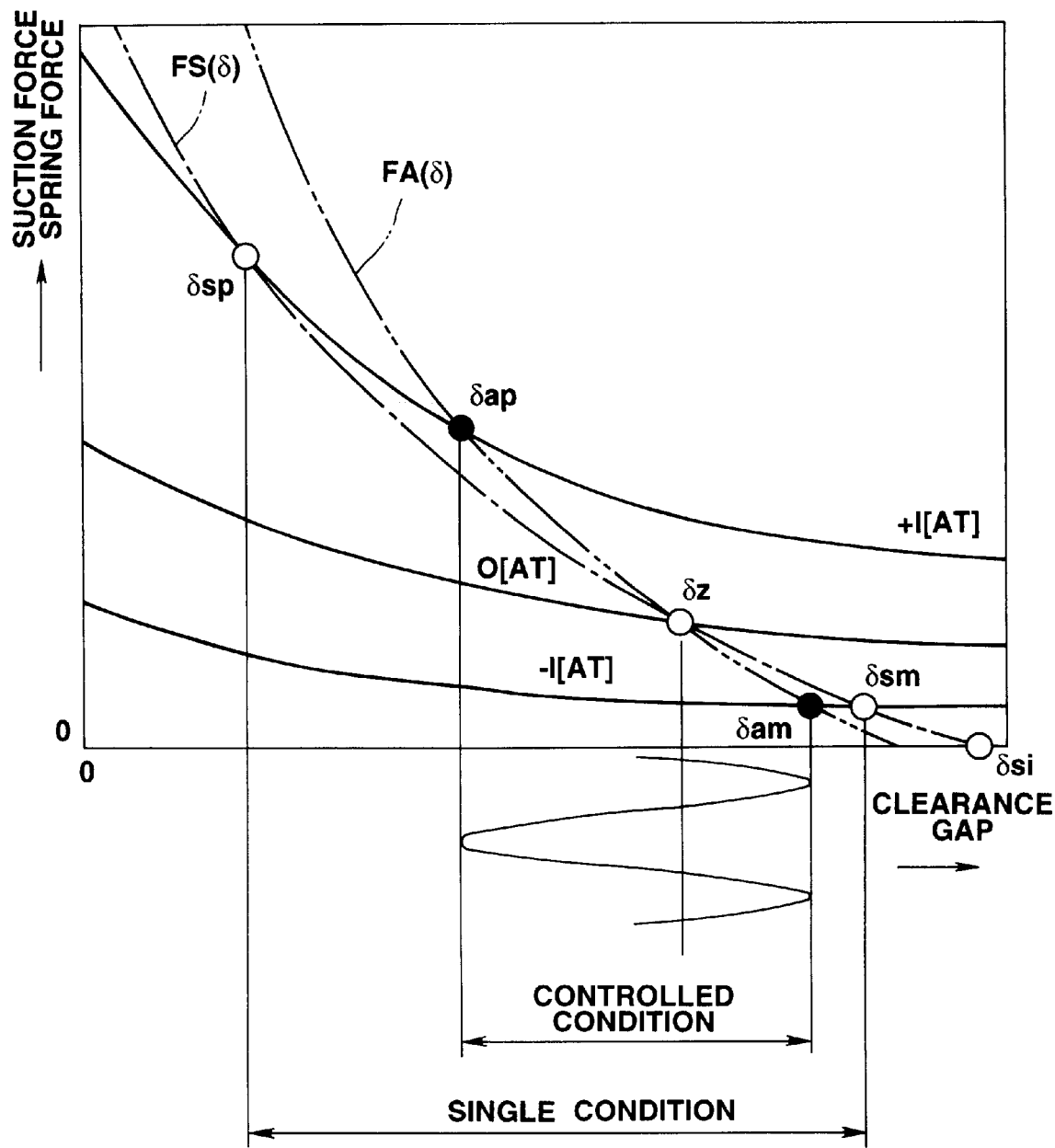
FIG. 7 is a diagram which shows a relationship between a clearance gap between a movable member and an electromagnetic actuator, a suction force applied to the movable member and spring force.

FIG. 7 shows a characteristic diagram of a relationship between the clearance gap between the electromagnetic actuator 10 and the movable plate 14, the suction force of the electromagnetic actuator 10, and the spring force applied to the movable plate 14. The suction force is represented by a continuous line, and the spring force is represented by a dot and dash line and a two-dots and dash line. The suction force of the electromagnetic actuator 10 shown in FIG. 7 is a characteristic obtained in a case that magnetomotive force is generated by the supplement of AC current I [AT: Ampere Turn] to the exciting coil 10B. 0 [AT] represents the moment that no electric current is supplied to the exciting coil 10B, +I [AT] represents the moment that a maximum electric current is applied to the exciting coil 10B so that the direction (a suction direction) of the magnetic force of the exciting coil 10b is the same as that of electromagnetic actuator 10, and −I [AT] represents the moment that a maximum electric current is applied to the exciting coil 10B so that the direction (a repulsive direction) of the magnetic force of the exciting coil 10b is inverse of that of electromagnet 10. The clearance gap $\delta_{ai}$ in FIG. 7 is a distance between the movable plate 14 and the electromagnetic actuator 10 when no magnetic force of the electromagnetic actuator 10 is applied to the movable plate 13 so that no elastic deformation is generated in the plate spring 12.

The relationship between the clearance gap $\delta$ and the control force $f_a$ generated by the electromagnetic actuator 10 is an inverse proportion between the control force $f_a$ and a square of the clearance gap $\delta$ as follows:

$$f_a = \alpha (b+I)^2/(\delta+a)^2 \quad (4)$$

wherein $\alpha$, a and b are constants determined by the characteristic of the electromagnetic actuator 10.

In FIG. 7, when no electric current is supplied to the exciting coil 10B of the electromagnetic actuator 10, a balanced position of the suction force of the electromagnetic actuator 10 and the spring force of the plate spring 12 is a position to form a clearance gap $\delta_z$. The movable plate 14 moves to change the clearance gap $\delta_z$ by flowing AC electric coil to the exciting current 10B.

If the movable plate 14 is set in a single condition that only spring force of the plate spring 12 functions as spring force for elastically supporting the movable plate 14, the spring characteristic of the plate spring 12 becomes a non-linear characteristic represented by the dot and dash line shown in FIG. 7. Therefore, the movable plate 14 is displaced between the clearance gap $\delta_{sm}$ and the clearance gap $\delta sp$.

It is assumed that a relationship between the displacement (clearance gap $\delta$) of the movable plate 14 in the single condition and the spring force is represented by FS($\delta$). However, when the movable plate 14 is practically installed in the engine mount 1 and the transferring force f against the displacement input $x_0$ is fully canceled, the spring force applied to the movable plate 14 is represented by a characteristic FA($\delta$) where the additional factor of the equation (2) is added to the characteristic FA($\delta$). Therefore, the characteristic FA($\delta$) in the assembled condition is represented by the following equation (5).

$$F(\delta) = FS(\delta) + \{R^2 K_m K_e/(K_m + K_e)\}\delta \quad (5)$$

Since the gradient of the characteristic FA($\delta$) is greater than that of the characteristic FS($\delta$), the movable plate 14 is displaced between the cavity distance $\delta_{am}$ and the clearance gap $\delta_{ap}$ during the actual control. That is, since it is important to move the movable plate 14 by a predetermined stroke (a difference between the clearance gap $\delta_{am}$ and the clearance gap $\delta_{ap}$) during the actual control in order to cancel a large vibration input at the engine mount 1, it is preferable to set the clearance gap $\delta_{am}$ as large as possible and the clearance gap $\delta_{ap}$ as small as possible. In other words, it is preferable that the gradient of the characteristic FA($\delta$) is set gentle.

As is clear from the equation (5), it is preferable to set the characteristic FS(d) of only the plate spring 12 and the additional spring factor determined by the support spring and the expansion spring of the support elastomer 6 to be smaller. However, if the characteristic of the supporting spring of the support elastomer 6 is set small, the static supporting rigidity of the engine mount 1 is degraded. If the characteristic of the expansion spring of the support elastomer 6 is set small, the active control force generated at the engine mount 1 becomes small. Therefore, it is preferable to lower the rigidity of the plate spring 12. By setting the movable plate 12 at a position far from the electromagnetic actuator 10 and by using a large type electromagnetic actuator 10 to generate larger control force, it becomes possible to increase the stroke of the movable plate 14. However, such a plan invites to increase the size of the device and the cost thereof.

In contrast, according to the present invention the plate spring 12 has an opening 12A and slits 12B to form the plurality of plate spring portions 12C with which the movable plate 14 is supported. Further, the outer periphery of the plate spring 12 is fixed to the actuator case 8. Therefore, the spring rigidity of the plate spring 12 per unit thickness is lowered as compared with a conventional structure where a normal plate spring is used. This enables the gradient of the characteristic FA($\delta$) to be gentle. Accordingly, the elastically deformable range of the plate spring 12 is increased, and the displacement of the movable plate 14 is increased so that the control force generated by the electromagnetic actuator is increased.

Figure 8:
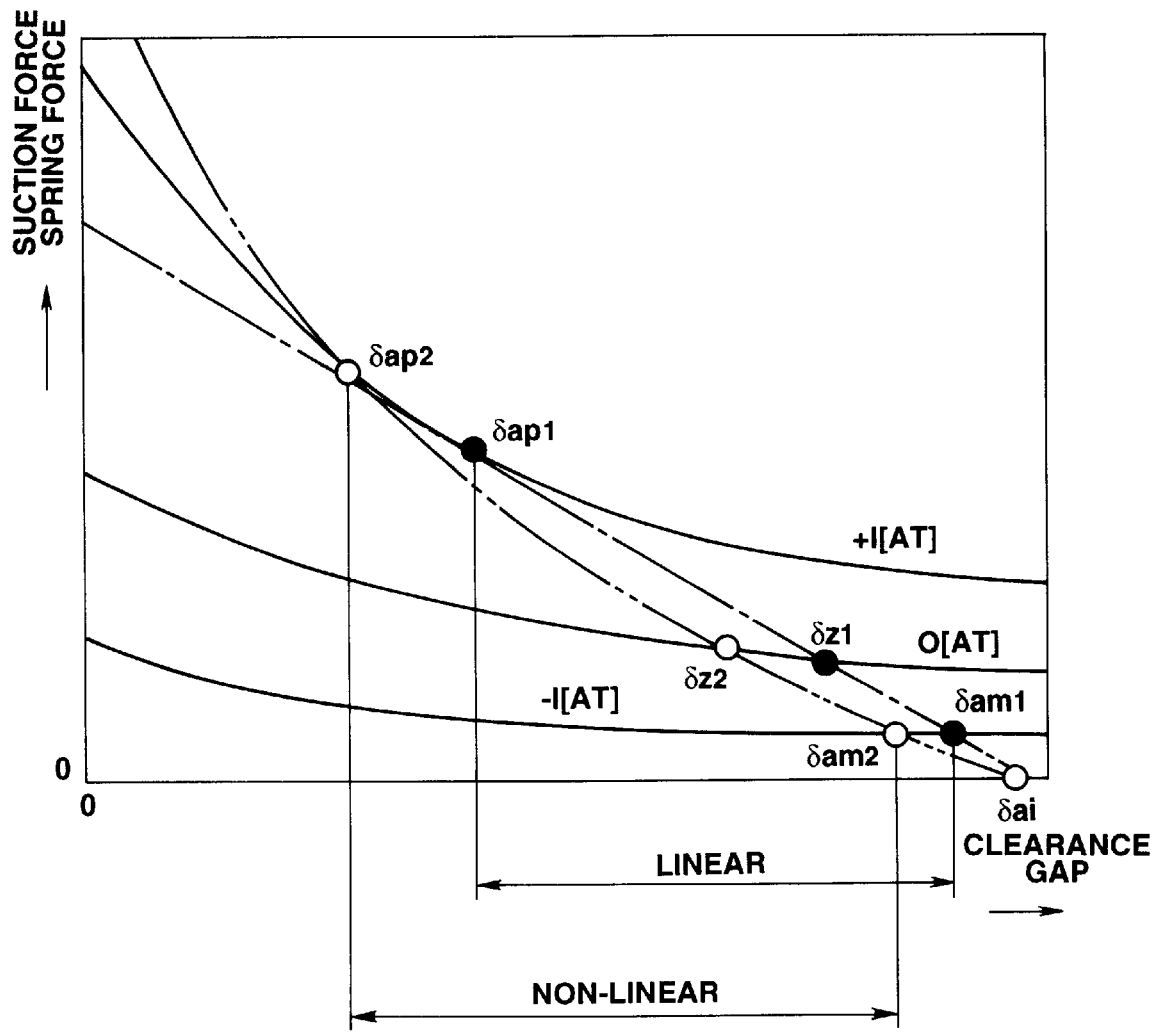
FIG. 8 is a diagram which shows a relationship between the clearance gap between the movable member and the electromagnetic actuator, a suction force applied to the movable member and the spring force under a linear spring characteristic and a non-linear spring characteristic.

FIG. 8 shows a characteristic diagram where a case that the plate spring 12 performs a linear characteristic shown by a dot and dash line is compared with a case that it performs a non-linear characteristic shown by a two-dots and dash line. In case that the plate spring 12 performs a linear characteristic, the spring force of the plate spring 12 is in proportion with a displacement of the movable plate 14. Therefore, in order to maximize the stroke of the movable plate 14 upon taking the balance between the spring force and the suction force of the electromagnetic actuator 10 (the suction force is in reverse proportion with the square of the clearance gap $\delta$), as shown by the dot and dash line of FIG. 8, the gradient of the spring force should be controlled to contact with the characteristic curve of the suction force when +I [AT] is applied to the exciting coil 10B (so that the suction force is maximum). By this arrangement, the movable plate 14 is displaced between the clearance gap $\delta_{ap1}$ and the clearance gap $\delta_{am1}$ which is an intersection of the characteristic curve and the characteristic curve of the plate spring 12 during when –I [AT] is applied to the exciting coil 10b so that the suction force of the electromagnetic actuator 10 becomes minimum. However, if the linear characteristic of the plate spring 12 is set as shown in FIG. 8, in the case that movable plate 14 is slightly approached from the clearance gap $\delta_{ap1}$ to the electromagnetic actuator 10, it may cause the plate spring 12 to collide with the electromagnetic actuator 10 because the suction force of the electromagnetic actuator 10 becomes relatively larger than the spring force of the plate spring 12. Such unexpected displacement of the movable plate 14 is generated, for example, when unexpected vibration is inputted from a road surface to the engine mount 1 through a suspension and the member 35.

Accordingly, in case that the characteristic of the plate spring 12 is linear, the plate spring 12 is practically set to be larger than that shown in FIG. 8 so that the clearance gap $\delta_{ap1}$ which is of an intersection of the spring force characteristic curve and the suction force characteristic curve during +I [AT] is further separated from the electromagnetic actuator 10. However, this arrangement decreases the stroke of the movable plate 14 and therefore it contradicts the above-mentioned demand.

In contrast, if the characteristic of the plate spring 12 is arranged such that its spring constant becomes large according to the approach of the movable plate 14 to the electromagnetic actuator 10 as performing a non-linear characteristic, the intersection between the characteristic curve during +I [AT] applied and the plate spring characteristic curve shown by a two-dots and dash line is set at a nearer position. That is, since the characteristic curve of the plate spring 12 describes a downwardly projecting curve as is similar to the characteristic curve during +I [AT] flowing time, it is possible to gradually approach the characteristic curve of the plate spring 12 to the characteristic curve during +I [AT] flowing time according to the decrease of the clearance gap $\delta$. It becomes possible to approach the intersection between both characteristic curves to the position of $\delta=0$ as compared with the case of the linear characteristic of the plate spring 12.

Further, as shown in FIG. 8, if the plate spring 12 is set to generate spring force greater than the suction force of the electromagnetic actuator 10 at the position $\delta=0$ when the movable plate 14 is displaced to a position where the movable plate 14 is in contact with the electromagnetic actuator 10 ($\delta=0$), the spring force of the plate spring 12 becomes greater than the suction force of the electromagnetic actuator 10 in case that the movable plate 14 is slightly displaced toward the electromagnetic actuator 14 from the clearance gap $\delta_{ap2}$. This prevents the plate spring 12 from colliding with the electromagnetic actuator 10. In contrast, in the case that the movable plate 14 performs a linear characteristic, if the spring force of the plate spring 12 at the position $\delta=0$ is set to be greater than the suction force of the electromagnetic actuator 10, the clearance gap $\delta_{ap1}$ becomes further great and the stroke of the movable plate 14 becomes small although the collision between the plate spring 12 and the electromagnetic actuator 10 is prevented.

Therefore, the plate spring 12 elastically supporting the movable plate 14 is required to have low rigidity as mentioned above and the non-linear characteristic such that the spring force becomes large according to the approach of the movable plate 14 to the electromagnetic actuator 10 while avoiding the collision between the movable plate 14 and the electromagnetic actuator 10.

According to the present invention, since the outer periphery of the plate spring 12 is fixed to the actuator case 8 so as to be sandwiched between the ring member 11 and the supporting member 13 including a supporting surface 16, the spring constant of the plate spring 12 is radically increased according to the approach of the movable plate 14 to the electromagnetic actuator 10 to perform the non-linear characteristic even in a micro displacement range.

Figure 9:
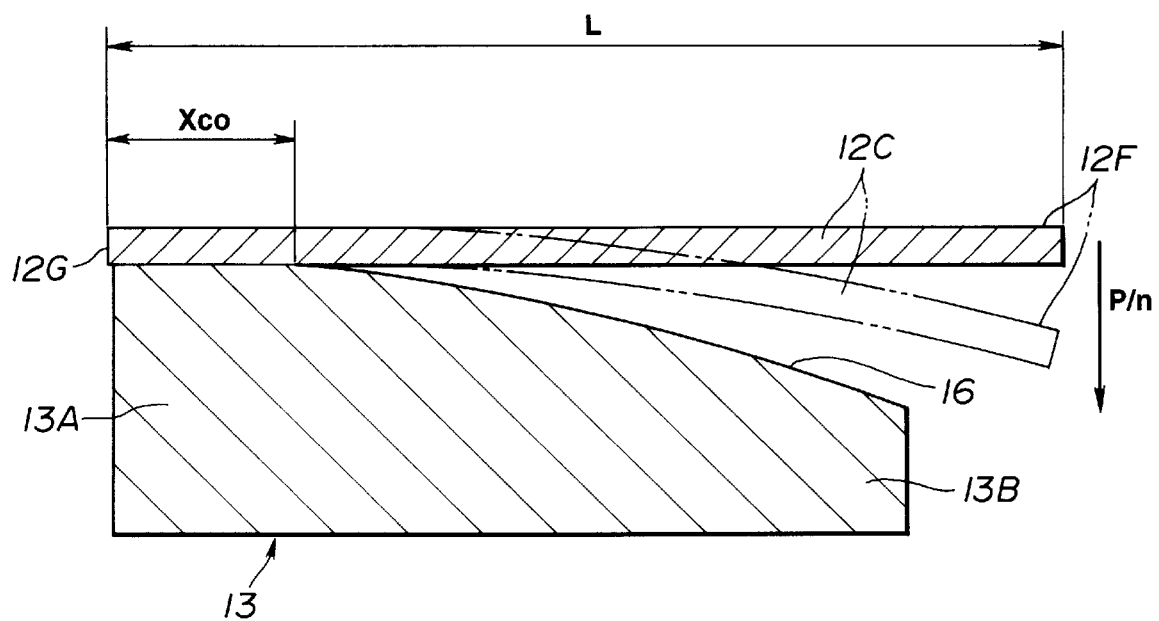
FIG. 9 is an enlarged view of part of FIG. 1.

That is, the plate spring 12 may be regarded as an aggregate of the plate spring portions 12C and it may be assumed that the movable plate 14 is supported by the plate spring portions 1 2C regarded as a cantilever. Therefore, inner ends of the plate spring portions 12C (ends in contact with the moveable plate 14) is free ends, and ends of the plate spring portions 12C in contact with the supporting member 13 is fixed ends. In the first embodiment, the supporting surface 16 is formed on the supporting member 13, the contact area between the plate spring portions 12C and the supporting member 16 gradually increases according to the increase of the displacement of the free end 12F of the plate spring portions 12C toward the electromagnetic actuator 10 as shown in FIG. 9 where a relationship between one of the plate spring portions 12C and the supporting member 13 is represented. That is, the plate spring portions 12C are deformed as if the fixed end 12G of the plate spring portion 12C during non-controlled condition is gradually moved toward the free end 12F. Therefore, the spring constant of the plate spring 12 is increased by this shortening of a distance between the free end 12F and the fixed end 12G which distance functions as an actual plate spring.

Therefore, by a simple structure that the supporting member 13 including a supporting surface 16 is installed to the actuator case 8 in the first embodiment according to the present invention, a desired non-linear spring characteristic of the plate spring 12 is easily ensured. Although a micro adjustment of the non-linear characteristic of the plate spring 12 is generally determined by the shape of the supporting surface 16 in contact with the plate spring 12, the curve of the supporting surface 16 along with the plate spring portions 12C may be determined by the following equation (6).

$$y_c = f_c(x_c) \tag{6}$$

Assuming that due to the suction force P/n applied to one plate spring portion 12C from the electromagnetic actuator 10 through the movable plate 14, a section from the fixed end 12G to the contact distance $x_{c0}$ of the plate spring portion 12C is in contact with the supporting surface 16, a relationship between the contact distance $x_{c0}$ and the displacement amount dc at the free end 12F is represented by the following equation (7).

$$d_c = y_c + (L-x_{c0})dy_c/dx_c + P(L-x_{c0})^3/3nEJ = Y_c + (L-x_{c0})dy_c/dx_c + f\{(L-x_{c0})^2/3n\}d^2y_c/dx_c^2 \tag{7}$$

wherein $d_c$ is a displacement amount of the plate spring portion 12C at the free end 12F, $x_c$ is a length form an initial fixed end 12G, $Y_c$ is a depth from a surface of the plain plate portion 13A at the position of the length $x_c$, L is a maximum length of the plate spring portion 12C functioning as a cantilever, P is suction force applied to the plate spring from the electromagnetic actuator 10 through the movable plate 14, n is the number of the plate spring portions 12C, E is Young's modulus, and J is a geometrical moment of inertia.

On the other hand, assuming that the spring constant of the plate spring 12 at the contact distance $x_{c0}=0$ is $K_{p0}$, $K_{p0}$ is represented by the following equation (8).

$$K_{p0} = 3nEJ/\{L^3(L-v^2)\} \tag{8}$$

wherein v is Poisson's ratio.

Accordingly, the spring constant $K_{px}$ of the plate spring 12 at the contact distance $x_{c0}$ is represented by the following equation (9).

$$K_{px} = 3nEJ/\{(L-x_{c0})^3(L-n^2)\} = K_{p0}L^3/(L-x_{c0})^3 \tag{9}$$

Further, assuming that a relationship between the suction force P and the displacement amount δ is represented by the following equation (10), $$P = FS(\delta_c) \tag{10}$$

the spring constant $K_{px}$ of the plate spring 12 at the contact distance $x_{c0}$ is a difference term of the equation (10). Accordingly, the spring constant $K_{px}$ is represented as follows.

$$K_{px} = dP/d\delta_c = FS'(\delta_c) \tag{11}$$

The relationship between the spring constant $K_{px}$ and the displacement amount δc is represented by the following equation (12).

$$\delta_c = F(K_{px}) \tag{12}$$

On the basis of the equations (6) to (12) and the characteristic function between the generated spring force and the displacement of the movable plate 14 which is arranged to enlarge the transfer ratio of the displacement of the movable plate 14 with respect to the flowed electric current to the electromagnetic actuator 10, the curve of the supporting surface 16 is determined. That is, the equation (6) is determined.

With the first embodiment according to the present invention, it becomes possible that the spring constant of the plate spring 12 is set to perform a desired non-linear characteristic within a micro displacement. For example, it is possible to change the spring force of the plate spring 12 ranging from several kgf to a hundred several tens kgf with respect to the displacement within a range 1–2 mm. Further, since such characteristic is obtained without increasing the size of the engine mount 1, it is advantageous in view of the space limitation for equipping on the vehicle.

With the first embodiment according to the present invention, since the movable plate 14 is elastically supported through the plate spring 12 having the slits 12B, it is possible to enlarge the stroke of the movable plate 14 and to set the characteristic of the spring constant into the non-linear characteristic so that the spring constant is gradually increased according to the approach of the movable plate 14 to the electromagnetic actuator 10, and to easily adjust the characteristic by properly selecting a curve of the supporting surface 16 along the plate spring portions 12C. Therefore, the stroke of the movable plate 14 can be increased. Further, since this arrangement enables the execution of the effective vibration decreasing control even if a considerably large vibration input is applied to the engine mount 1, it is preferable to support the diesel engine or large cubic-capacity gasoline-engine by the engine mount according to the present invention. Furthermore, the above-mentioned advantages are ensured without enlarging the size of the arrangement and without increasing the production cost thereof. Further, since the rigidity of the plate spring 12 is decreased by applying a plurality of slits 12B, the durability of the plate spring 12 is not largely decreased as in a case that the decrease of the rigidity of the plate spring 12 is ensured by decreasing the thickness of the plate spring.

Figure 10:
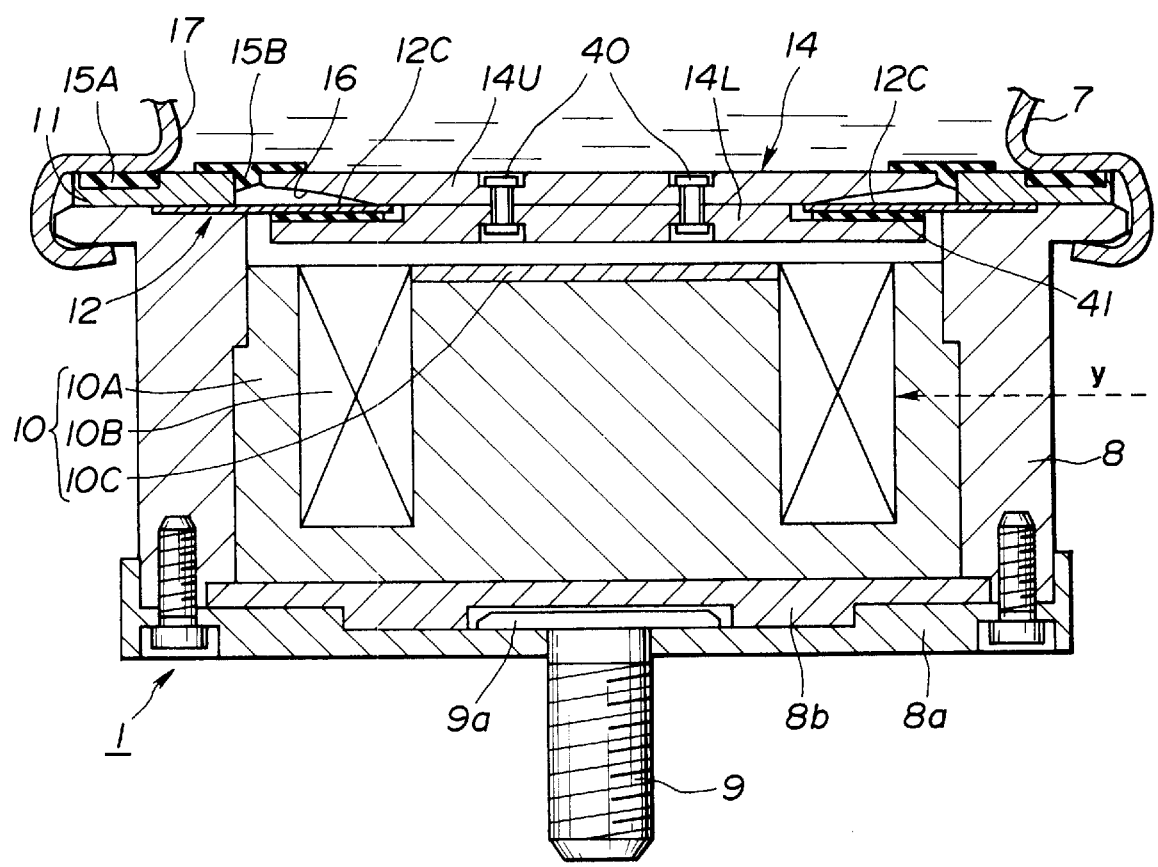
FIG. 10 is a cross-sectional view of part of the vibration insulating device of a second embodiment.

Referring to FIG. 10, there is shown a second embodiment of the engine mount 1 according to the present invention. In the second embodiment, elements and parts the same as those of the first embodiment are designated by the same reference numerals, and their explanations are omitted herein. Although FIG. 10 does not show an upper half portion of the vibration insulating device according to the present invention, such not-shown portion is quite the same as that of the first embodiment. Therefore, such portion is omitted in FIG. 10.

The ring member 11 is sandwiched between the outer cylinder 7 and a caulked portion of the actuator case 8, and the outer periphery of the plate spring 12 is sandwiched between the ring member 11 and the upper end surface of the actuator case 8. The plate spring 12 has a flat surface and does not have the flanged end portion shown in FIG. 3. A ring-shaped seal member 15A is embedded in the upper surface of the ring member 11 in order to prevent the fluid from leaking from the main fluid chamber 17 through a slit between the outer cylinder 7 and the ring member 11.

The movable plate 14 is constituted by an upper movable plate 14U and a lower movable plate 14L which are integrally connected by means of a plurality of rivets 40. The upper and lower movable plates 14U and 14L are made by a magnetizable disc such as an iron disc. It will be understood that either the upper movable plate 14U or the lower movable plate 14L may be made of a magnetizable material.

The upper movable plate 14U has a supporting surface 16 at a side directed toward the plate spring 12. The supporting surface 16 is formed to be an inclined surface upwardly inclined according to the approach toward an upper periphery. A ring-shaped space is formed between the inner periphery of the ring member 11 and the outer periphery of the upper movable plate 14U. A seal member 15B is inserted in the ring-shaped space. The inner end of each plate spring portion 12C of the plate spring 12 is in contact with a lower surface of the upper movable plate 14U to support the movable plate 14. A ring-shaped rubber sheet 41 is disposed on a portion of the lower plate member 14L facing the supporting surface 16 in order to avoid the direct collision with the plate spring portions 12C. The other structure of the second embodiment is the same as that of the first embodiment.

In this arrangement, the plate spring 12 may be regarded as an aggregate of the plate spring portions 12C and therefore the rigidity per unit thickness is low. Therefore, it is possible to ensure a long stroke of the movable plate 14. Since the contact area of the plate spring- 12 with the supporting surface 16 is increased according to the displacement of the movable plate 14 toward the electromagnetic actuator 10, it is possible to set the plate spring 12 so as to have a non-linear characteristic. The fine setting of the non-linear characteristic may be easily ensured by properly selecting a curve of the supporting surface 16. This ensures a functional merit the same as that of the first embodiment.

Furthermore, since the supporting surface 16 is formed in the movable plate 14, it is easy to elongate a part of the plate spring portions 12C functioning as a cantilever. This easy elongation of the plate spring portions increases a tuning range of the spring characteristic and improves the degree of freedom in design. Further, it is possible to increase the thickness of the plate spring portions 12C so as to improve the durability and reliability of the plate spring 12.

Figure 11:
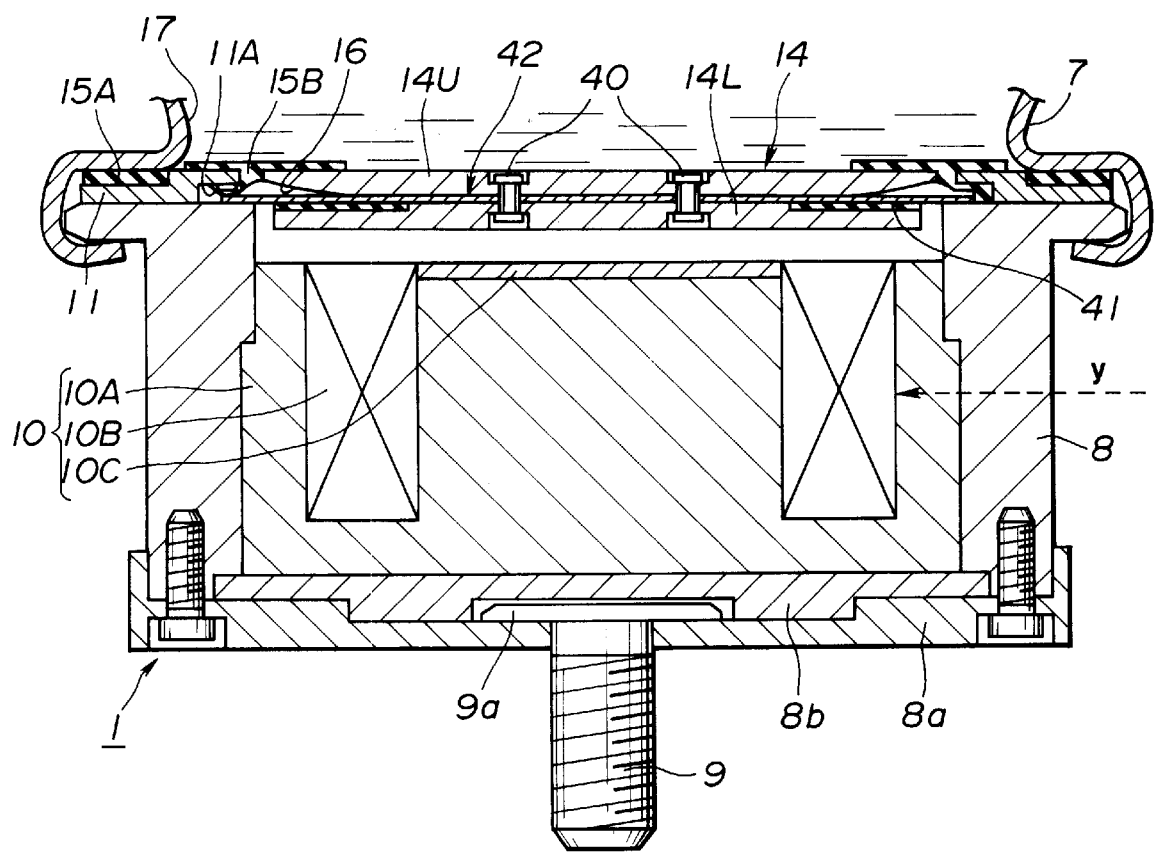
FIG. 11 is a cross-sectional view of part of the vibration insulating device of a third embodiment.
Figure 12:
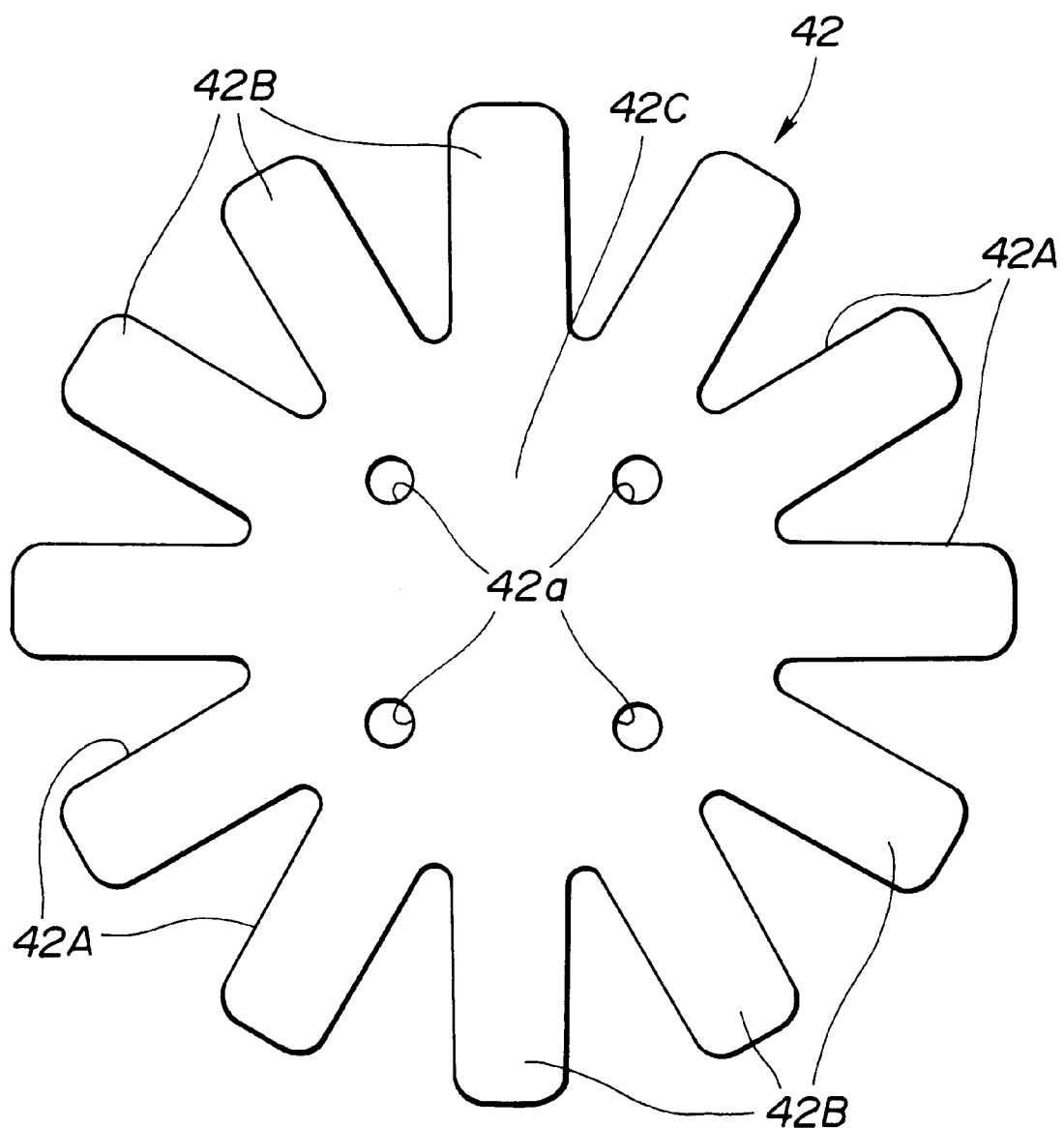
FIG. 12 is a plan view of a plate spring of the third embodiment.

Referring to FIGS. 11 and 12, there is shown a third embodiment of the engine mount according to the present invention. In the third embodiment, elements and parts the same as those of the first embodiment are designated by the same reference numerals, and their explanations are omitted herein. Although FIG. 11 does not show an upper half portion of the vibration insulating device according to the present invention, such not-shown portion is quite the same as that of the first embodiment. Therefore, such portion is omitted in FIG. 11.

Although the movable plate 14 is made by the upper movable plate 14U and the lower movable plate 14L as similar to that in the second embodiment, a plate spring 42 functioning as a elastic member is sandwiched between the upper and lower movable plates 14U and 14L. As shown in FIG. 12, the plate spring 42 is a disc-shaped plate spring having a plurality of through holes 42a for rivets 40. A plurality of V-shaped slits 42A are formed at the outer periphery of the plate spring 42 toward a center portion. These slits 42A define a plurality of rectangular plate spring portions 42B extending radially. That is to say, the plate spring 42 has a structure constituted by a circular center portion 42C and the plurality of plate spring portions 42B radially extending from the center portion 42C.

As shown in FIG. 11, the center portion 42C of the plate spring 42 is sandwiched between the upper and lower movable plates 14U and 14L and are integrally connected with each other through the rivets 40. An outer end of each plate spring portion 42B is in contact with the upper surface of the actuator case 8 so that the movable plate 14 is elastically supported to the actuator case 8 through the plate spring 42. In this third embodiment, the ring member 11 has a circular cutout 11A at its lower and inner surface so as to ensure the connecting area where the end portion of the plate spring portion 42B and the upper end portion of the actuator case 8 is in contact. A part of the seal member 15B is inserted in the cutout 11A so that oil leakage and generation of strange noise are prevented by stopping the horizontal slide between the plate spring portions 42B and the actuator case 8. The other structure of the third embodiment is the same as that of the first embodiment.

With the thus arranged vibration insulating device of the third embodiment, the plate spring 42 may be regarded as an aggregate of the plate spring portions 42C and therefore the rigidity per unit thickness is low. Therefore, it is possible to ensure a long stroke of the movable plate 14. Since the contact area of the plate spring portions 42B with the supporting surface 16 is increased according to the displacement of the movable plate 14 toward the electromagnetic actuator 10, it is possible to set the plate spring 42 so as to perform a non-linear characteristic. The fine setting of the non-linear characteristic may be easily ensured by properly selecting a curve of the supporting surface 16. This construction also ensures a functional merit the same as that of the first embodiment.

Furthermore, since the supporting surface 16 is formed in the movable plate 14, it is easy to elongate a part of the plate spring portions 42C functioning as a cantilever. This easy elongation of the plate spring portions increases a tuning range of the spring characteristic and improves the degree of freedom in design. Further, it is possible to increase the thickness of the plate spring portions 42C so as to improve the durability and reliability of the plate spring 42.

Figure 13:
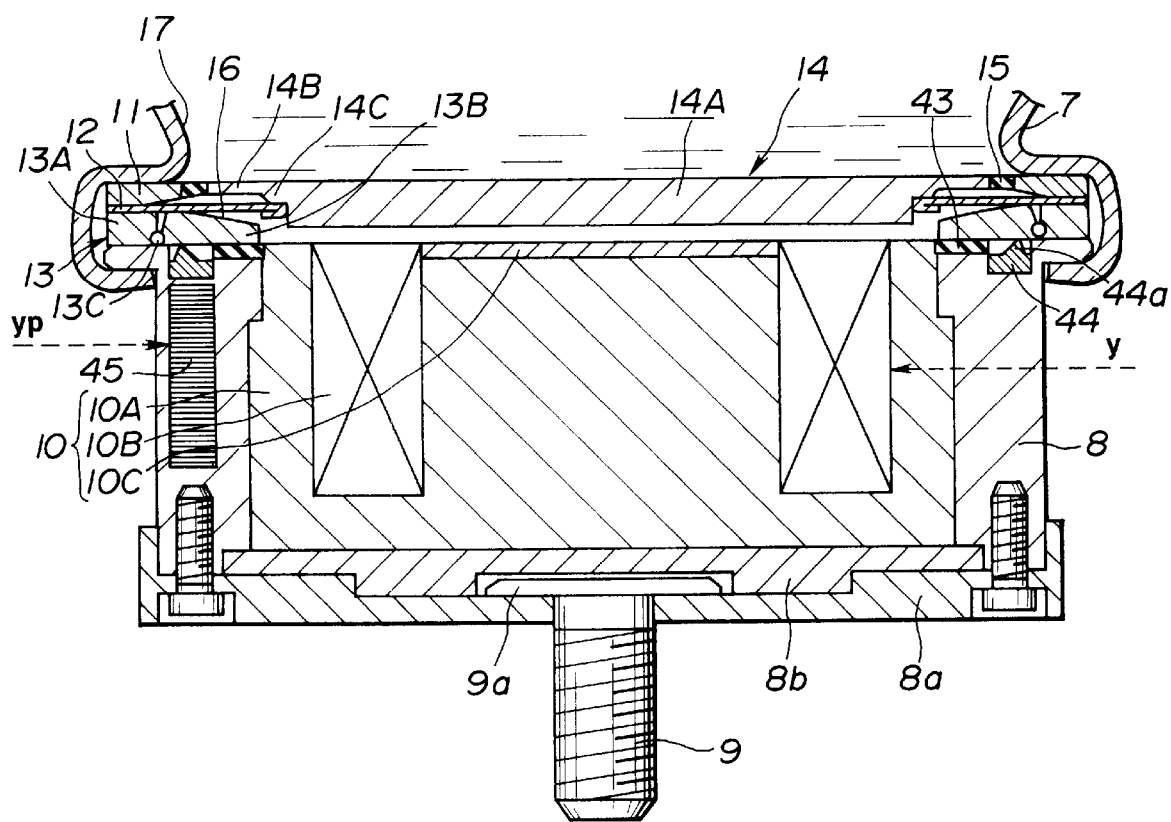
FIG. 13 is a cross-sectional view of part of the vibration insulating device of a fourth embodiment.
Figure 14:
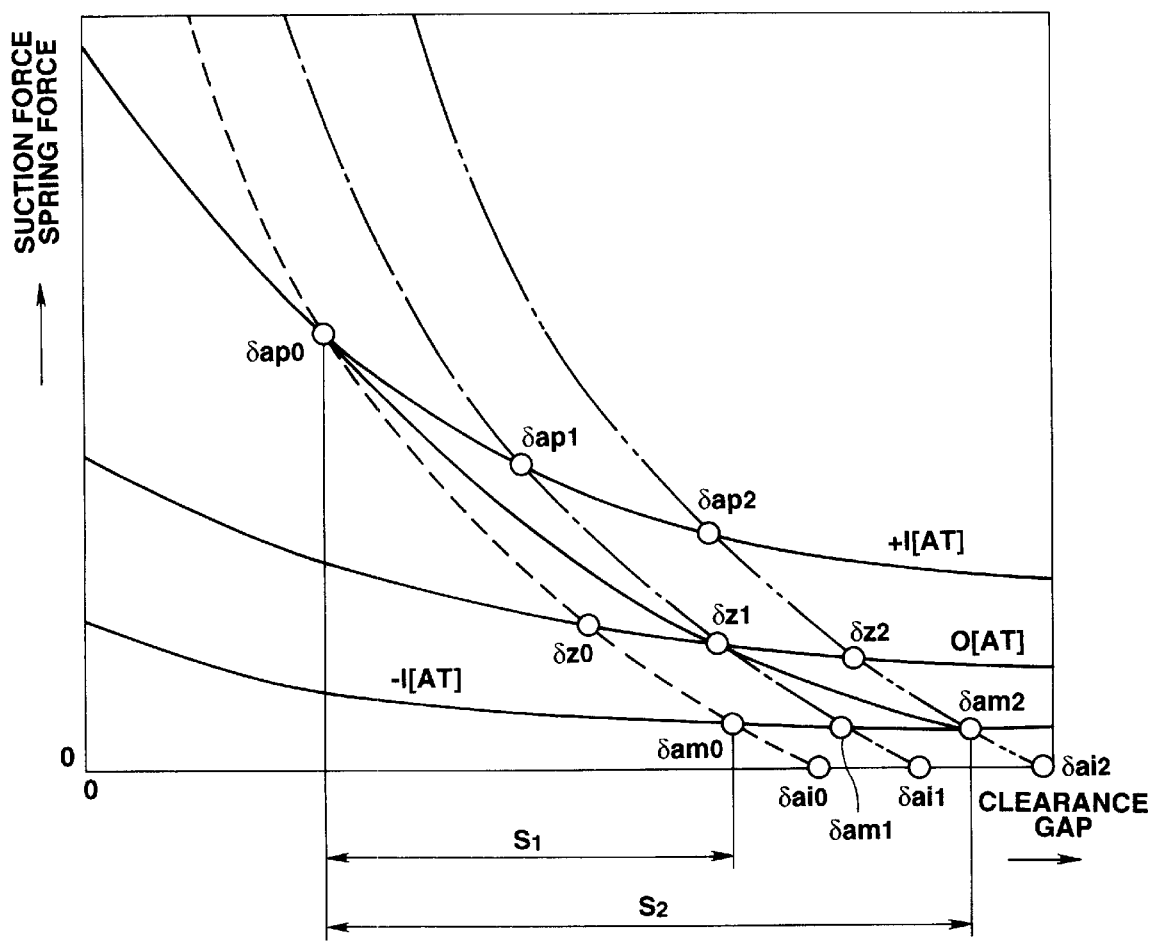
FIG. 14 is a diagram which shows a relationship between the clearance gap between the movable member and the electromagnetic actuator, suction force applied to the movable member and the spring force under a variable spring characteristic.
Figure 15:
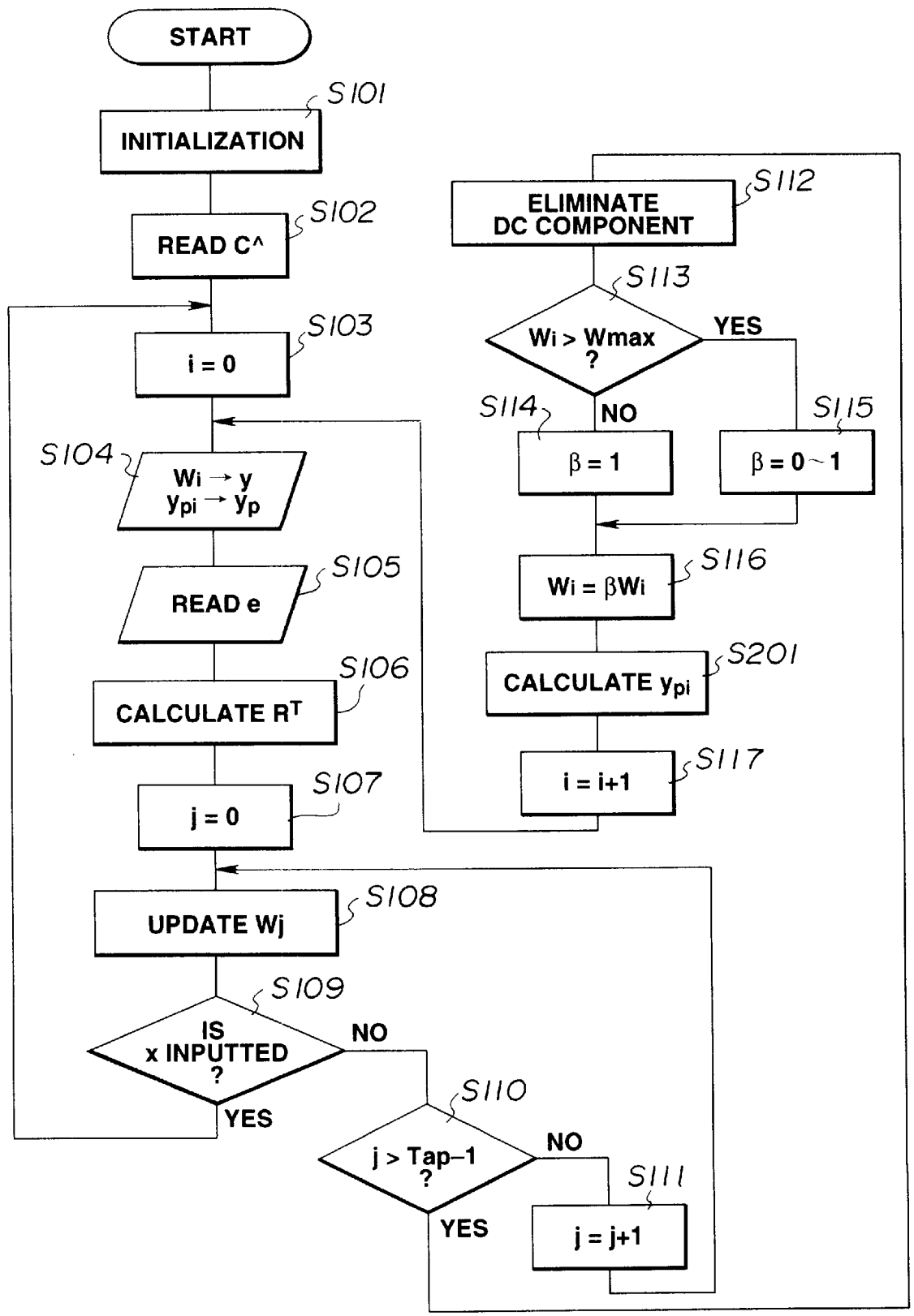
FIG. 15 is a flowchart which shows processing executed in a controller of the fourth embodiment.

Referring to FIGS. 13 to 15, there is shown a fourth embodiment of the engine mount according to the present invention. In the fourth embodiment, elements and parts the same as those of the first embodiment are designated by the same reference numerals, and their explanations are omitted herein. Although FIG. 13 does not show an upper half portion of the vibration insulating device according to the present invention, such not-shown portion is quite the same as that of the first embodiment. Therefore, such portion is omitted in FIG. 13.

The supporting member 13 is constituted by a flat plate portion 13A and a taper portion 13B which are swingably interconnected with each other through a link 13C. An elastic member 43 is disposed between a lower and inner side of the taper portion 13B and the actuator case 8 so that the inner periphery of the taper portion 13B can be vertically displaced.

A height adjusting ring 44 is embedded in a depression formed on the upper surface of the actuator case 8 so as to be vertically adjustable in its height. A projection 44a of a ring shape is formed on the upper surface of the height adjusting ring 44 so as to receive the lower surface of the taper portion 13C. In the actuator case 8, a plurality of piezoelectric actuators 45, which are respectively formed by vertically laminating a plurality of piezoelectric elements, are embedded in the actuator case 8 at equal intervals in the circumferential direction. In FIG. 13, one of the piezoelectric actuators 45 is shown.

The piezoelectric actuator 45 is arranged to receive a drive signal $y_p$ as a drive voltage from the controller 20 and changes its vertical length according to the drive signal $y_p$. This vertical change vertically displaces the height adjusting ring 44 so as to vertically displace the taper portion 13B.

By the vertical displacement of the inner peripheral portion of the taper portion 13B, the plate spring 12 is vertically displaced to change the clearance gap between the movable plate 14 and the electromagnetic actuator 10. Consequently, the inclination of the supporting surface 16 disposed on the taper portion 13B is changed. Therefore, the plate spring 12 performs the spring characteristic shown by a dotted line of FIG. 14, the case that the inner peripheral portion of the taper portion 13B is displaced so as to be nearest to the electromagnetic actuator 10. In the case that the inner peripheral portion of the taper portion 13B is displaced farthest from the electromagnetic actuator 10, the plate spring 12 performs the spring characteristic shown by a two-dots and dash line of FIG. 14. That is, the characteristic of the plate spring 12 is linearly changed within a range from the dotted line and the two-dots and dash line of FIG. 14, by properly adjusting the vertical position of the inner peripheral portion of the taper portion 13B.

By fixing the inner peripheral portion of the taper portion 13B at a position nearest to the electromagnetic actuator 10, the movable plate 14 is displaced within a stroke S1 which is a difference between the clearance gap $\delta_{ap0}$ and the clearance gap $\delta_{ai0}$. However, if the plate spring 12 is set to perform the characteristic shown by the two-dots and dash line during −I [AT] flowing time, by gradually approaching the characteristic of the dotted line to the characteristic of the two-dots and dash line according to the distance-increase of the movable plate 14 from the clearance gap $\delta_{ap0}$, in a manner of the upward lifting of the inner peripheral portion of the taper portion 13B, the movable plate 14 is displaced within a stroke S2 of the difference between the clearance gap $\delta_{ap0}$ and the clearance gap $\delta_{ai2}$. This enables the movable plate 14 to be displaced within the broadened range.

That is to say, by properly outputting the drive signal $y_p$ to the piezoelectric actuator 45 synchronously with the drive signal y to the electromagnetic actuator 10, the movable plate 14 is displaced within a stroke range of the difference between the clearance gap $\delta_{ap0}$ and the clearance gap $\delta_{ai2}$. This executes an effective vibration reducing control with respect to the large vibration input. Therefore, the engine mount 1 further preferably functions as a engine mount for a diesel engine or large cubic-capacity gasoline-engine.

The flowchart of FIG. 15 shows a processing executed in the controller 20 the case that the drive signal $y_p$ is outputted to the piezoelectric actuator 45 synchronously with the drive signal y to the electromagnetic actuator 10. In this flowchart, the steps are same as those in the first embodiment are designated by the same reference numerals.

As an assumption in the case that the processing of FIG. 15 is executed, the voltage half of the maximum applied voltage Vmax is previously applied to the piezoelectric actuator 45 in order to set the motion neutral position at half of the maximum displacement of the electromagnetic actuator 10 so that the plate spring 12 performs the neutral characteristic shown by the dot and dash line of FIG. 14. Therefore, when the processing shown in FIG. 15 is executed, the routine proceeds from a step S116 to a step S201 wherein a drive signal $y_{pi}$ synchronized with the filter coefficient Wi is calculated. At the step S104, the drive signals y and $y_p$ are outputted. By this treatment, the movable plate 14 is displaced within a stroke S2 which is a difference between the clearance gap $\delta_{ap0}$ and the clearance gap $\delta_{ai2}$.

Although the displaceable range of the movable plate 14 is broadened from the stroke S1 to the stroke S2, the consumption of electric power at the exciting coil 10B of the electromagnetic actuator 10 does not increase. If the displaceable range of the movable plate 14 is set to be the same as that in case of no piezoelectric actuator 45, the consumption of electric power by the exciting coil 10B may be rather decreased. That is, since the inner periphery of the taper portion 13B is arranged to vertically move by means of the piezoelectric actuator 45, the electric power consumption at the exciting coil 10B of the electromagnetic actuator 10 is decreased even through the electric power consumption at the piezoelectric actuator 45 is increased. Since the increased amount of the electric power consumption at the piezoelectric actuator 45 is considerably smaller than the decreased amount of the electric power consumption at the exciting coil 10B, the total of the power consumption of the engine mount l is decreased. In addition, the fourth embodiment according to the present invention ensures the advantages obtained by the first embodiment. In the fourth embodiment, a characteristic varying means is constituted by the swingable taper portion 13B of the supporting member 13, the height adjusting ring 44 and the piezoelectric actuator 45.

Figure 16:
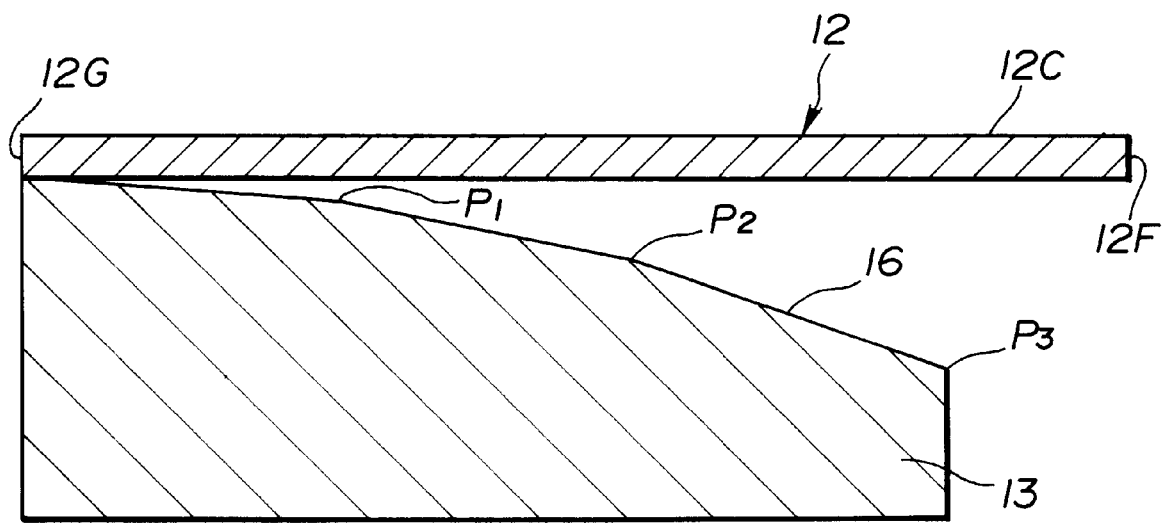
FIG. 16 is a cross-sectional view of part of a fifth embodiment.
Figure 17:
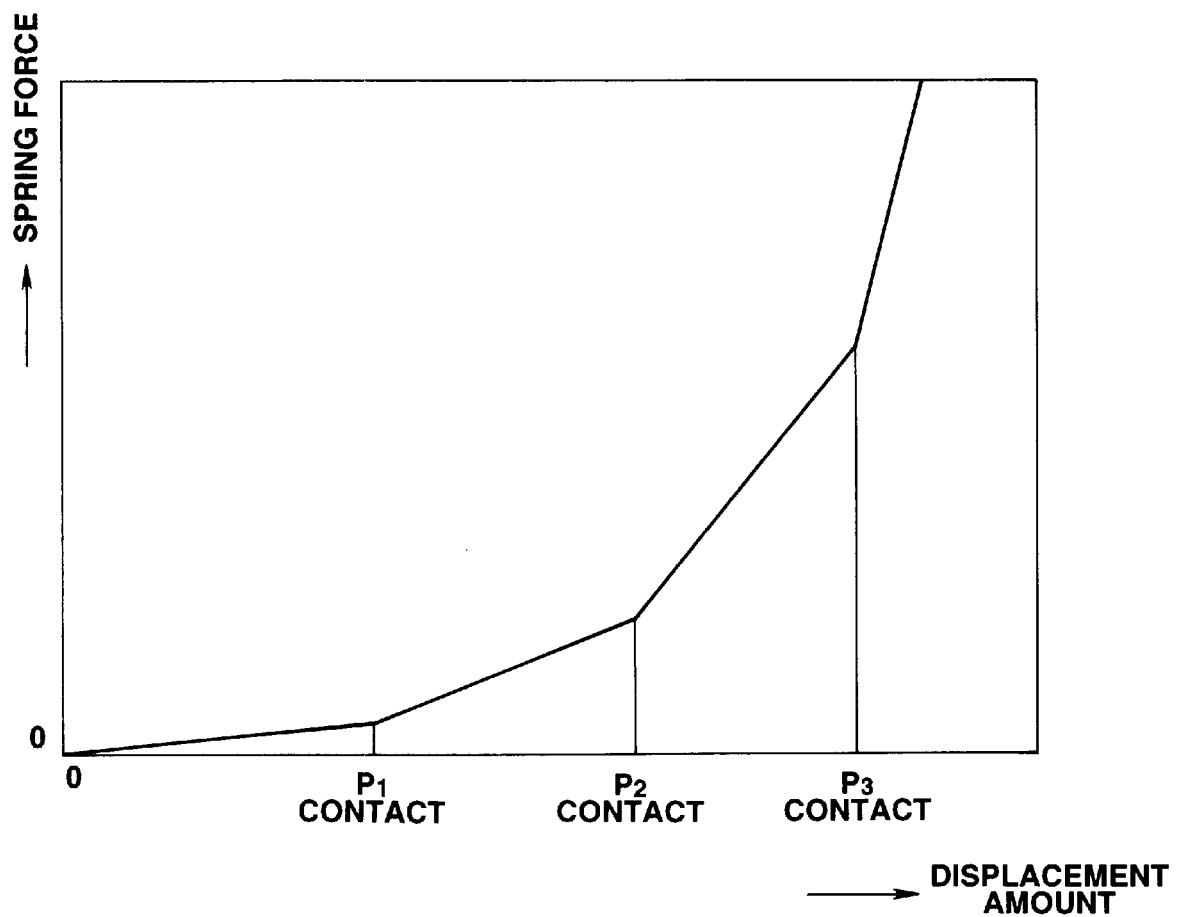
FIG. 17 is a diagram which shows a relationship between the displacement of the movable member and the spring force.
Figure 18:
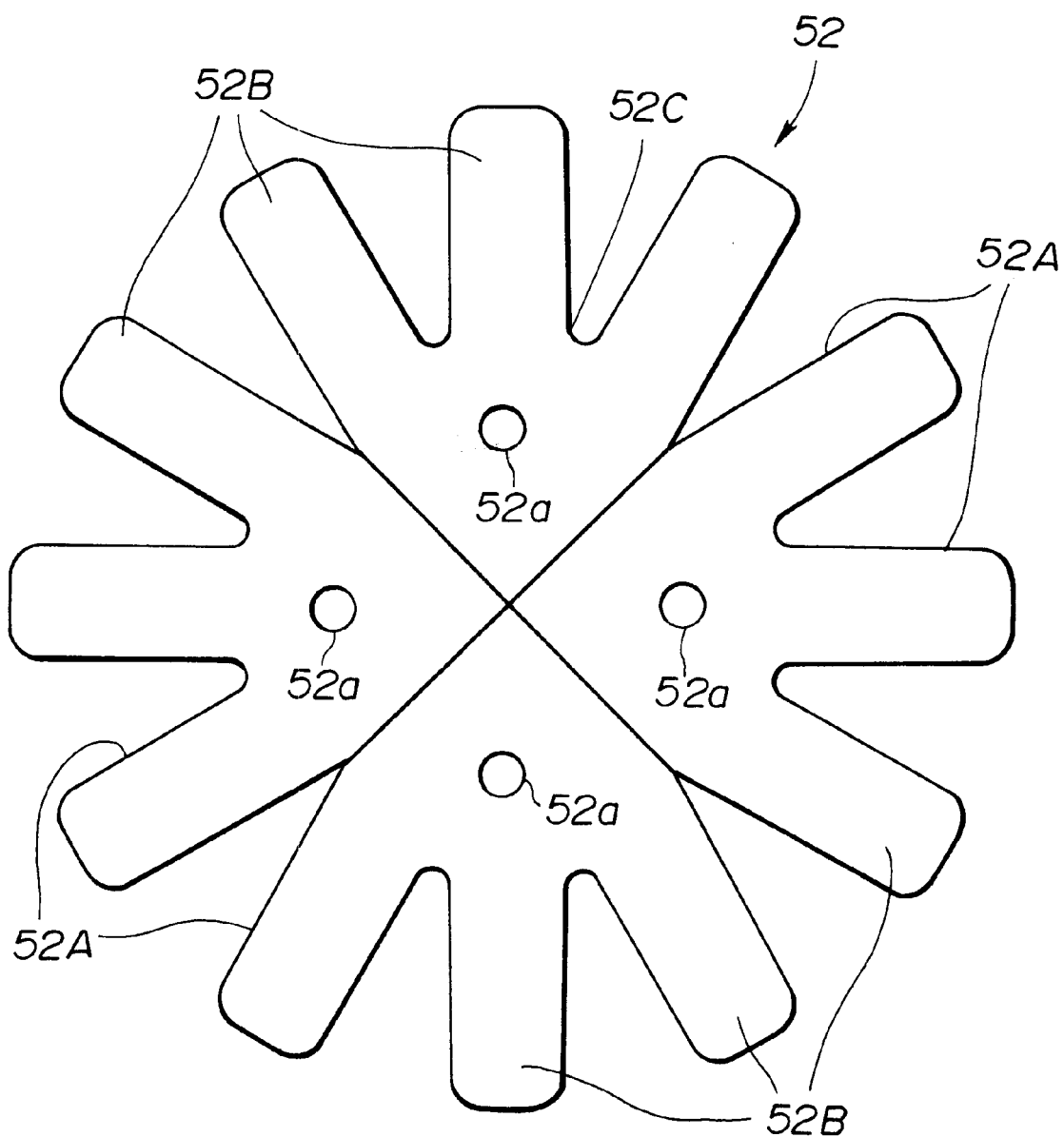
FIG. 18 is a plan view of a plate spring of another embodiment.

Referring to FIGS. 16 and 17, there is shown a fifth embodiment of the vibration insulating device according to the present invention. Since elements and parts of the fifth embodiment are as same as those of the first embodiment, a drawing showing a whole structure and explanations thereof will be omitted herein.

FIG. 16 is an enlarged cross-sectional view which shows the plate spring 12 and the supporting member 13. As shown in FIG. 16, the supporting surface 16 is equally divided into three surfaces so that their inclinations are increased stepwise toward the center portion of the device (toward the right hand side in FIG. 16). That is, the inclination of the supporting surface 16 is slightly inclined from an initial fixed end 12G of the plate spring 12 to a point PI, it is further inclined from the point P1 to a point P2, and it is even more inclined from the point P2 to a point P3.

With such a structure, the spring force of the plate spring 12 is increased stepwise according to the increase of the displacement of the movable plate 14 as shown in FIG. 17. That is, the relationship between the displacement amount and the spring constant of the plate spring 12 is represented by a characteristic that the spring constant is increased stepwise according to the approach of the movable plate 14 to the electromagnetic actuator 10. Accordingly, the fifth embodiment according to the present invention ensures the advantages mentioned in the first embodiment. Further, the machining of the supporting surface 16 of the supporting member 13 is simplified so as to decrease the production cost thereof. Although the supporting surface 16 of the fifth embodiment has been divided into three surfaces, it will be understood that the division of the supporting surface 15 is not limited to three surfaces and may be divided into four or two.

While the first embodiment has been shown and described so that the supporting member 13 including a supporting surface 16 is fixed to the actuator case 8, it will be understood that the upper end surface of the actuator case 8 is projected upward and the supporting surface 16 may be directly formed on the projected end surface of the actuator case 8. Further, the supporting surface 16 may be formed on both the actuator case 8 and the movable plate 14. That is, on at least one of the actuator case 8 and the movable plate 14, the supporting member 13 including the supporting surface 16 may be fixed or the supporting surface may be directly formed.

Although the preferred embodiments according to the present invention have been shown and described such that the movable plate 14 is elastically supported by a plurality of plate spring portions 12C functioning as a substantial plate spring which is prepared by forming the slits 12B is the disc-shaped plate spring 12 or a plurality of plate spring portions 42B functioning as a substantial plate spring which is prepared by forming a plurality of slits 42C in the disc-shaped plate spring 42, it will be understood that the plate spring may not be limited to the plate springs 12 and 42. For example, by radially arranging a plurality of rectangular plate springs and fixing their outer end portions to the supporting member 13 or ring member 11, the movable plate 14 may be supported to inner end portions of the rectangular plate springs, or by radially arranging a plurality of rectangular plate springs and fixing their inner end portions to the movable plate 14, outer end portions of the rectangular plate springs may be connected with the upper end surface of the actuator case. Further, it will be understood that the plate spring may be formed by four plate springs 52 so as to constitute a spring plate similar to the plate spring 42 of the fourth embodiment. These arrangements will ensure the advantages mentioned in the embodiments according to the present invention. Furthermore, if such independent plate springs are formed by a relatively thick plate and are applied to the device, the productivity is largely improved so as to reduce the production cost thereof.

Although the fourth embodiment has been shown and described such that the inner peripheral portion of the taper portion 13 is vertically displaced by using the piezoelectric actuators 45, it will be understood that it is not limited to this arrangement and may use magnetostrictive elements or a hydraulic actuator though it is preferable to use piezoelectric elements or magnetostrictive elements in view of the responsibility.

While the embodiments have been shown and described such that the vibration insulating effect is obtained by utilizing the fluid resonance generated when the fluid passes through the orifice 5a during the low frequency vibration input, it will be understood that the frequency generated by the fluid resonance is freely selected. Further, in the case that such fluid resonance effect is not applied to the vibration insulating device, the orifice construction member 5 and the diaphragm 4 and the like may be omitted from the system. That is, in such case, the parts may be decreased to reduce the production cost.

Although the above mentioned embodiments have been shown and described such that the drive signal y is generated according to the synchronized type Filtered-X LMS algorithm, it will be understood that the adapted algorithm may not be limited to this and may be a conventional Filtered-X LMS algorithm or LMS algorithm within the frequency range. Further, if the characteristic of the system is stable, the combination control of a conventional feed-forward control according to the reference signal x and a conventional feedback control according to the residual vibration signal e may be executed without using the adaptive algorithm of LMS algorithm and the like. For example, the drive signal y is generated by filter-processing the reference signal x through a coefficient fixed digital filter or analog filter, and the phase of the drive signal y is controlled.

What is claimed is:

1. A vibration insulating device interposed between a vibrating member and a structural member, the vibration insulating device comprising:

a main fluid chamber;

an elastic support partly defining said main fluid chamber;

fluid in said main fluid chamber;

a movable plate partly defining said main fluid chamber, said movable plate including magnetizable material;

an electromagnetic actuator that generates displacement force for displacing said moveable plate;

a holding member that holds said electromagnetic actuator and an elastic plate elastically supporting said movable plate and providing a force to said movable plate that is directed away from the electromagnetic actuator throughout the entire range of motion of the movable plate, said elastic plate including a plurality of plate spring portions which are radially arranged, said elastic plate being supported by the holding member.

2. A vibration insulating device interposed between a vibrating member and a structural member, the vibration insulating device comprising:

a main fluid chamber;

an elastic support partly defining said main fluid chamber;

fluid in said main fluid chamber;

a movable plate partly defining said main fluid chamber, said movable plate including magnetizable material;

an elastic plate elastically supporting said movable plate so that said movable plate can be displaced to change the volume of said main fluid chamber;

an electromagnetic actuator that generates displace for displacing said movable plate; and a holding member that holds said electromagnetic actuator;

wherein said elastic plate includes a disc-shaped plate spring having a center opening and a plurality of slits radially extending outwardly from the center opening, an inner periphery of the plate spring supporting said movable plate and an outer periphery of the plate spring being supported by the holding member, said elastic plate providing a force to said movable plate that is directed away from the electromagnetic actuator throughout the entire range of motion of the movable plate.

3. A vibration insulating device interposed between a vibrating means and a structural member, the vibration insulating device comprising:

a main chamber;

an elastic support partly defining said main fluid chamber;

fluid filled in said fluid chamber;

a movable plate partly defining said fluid chamber, said movable plate being made of magnetizable material;

an elastic plate elastically supporting said movable plate so that said movable plate is displaced to change the volume of said fluid chamber; and an electromagnetic actuator generating displacement force for displacing said movable plate;

wherein said elastic plate is made of a disc-shaped plate spring, a plurality of slits extending from an outer periphery toward a center portion thereof, the center of the plate spring supporting said movable plate, the outer periphery of the plate spring being supported to a supporting member side for supporting said electromagnetic actuator.

4. A vibration insulating device interposed between a vibrating member and a structural member, the vibration insulating device comprising:

a main fluid chamber;

an elastic support partly defining said main fluid chamber;

fluid in said main fluid chamber;

a movable plate partly defining said main fluid chamber, said movable plate including magnetizable material;

an elastic plate elastically supporting said movable plate;

an electromagnetic actuator that generates displacement force for displacing said movable plate to change the volume of said main fluid chamber; and a holding member that holds said electromagnetic actuator;

wherein said elastic plate includes plate springs each having an end connected to said movable plate and another end supported by the holding member, said elastic plate providing a force to said movable plate that is directed away from the electromagnetic actuator throughout the entire range of motion of the movable plate.

5. A vibration insulating device as claimed in claim 1, wherein a supporting member is formed in the vicinity of at least one of said movable plate and the holding member; the supporting member including a supporting surface which is formed so that an area of contact between the supporting surface and the elastic plate increases as said movable plate approaches said electromagnetic actuator.

6. A vibration insulating device as claimed in claim 1, wherein a supporting surface is formed on at least one of said movable plate and the holding member, an area of contact between the supporting surface and the elastic plate increasing as said movable plate approaches said electromagnetic actuator.

7. A vibration insulating device as claimed in claim 1, wherein a relationship between a spring constant of said elastic plate and a amount of displacement between the movable plate and the electromagnetic actuator is non linear, such that the spring constant increases as said movable plate approaches said electromagnetic actuator.

8. A vibration insulating device as claimed in claim 1, wherein said elastic plate performs the characteristic relationship between the displace amount and the spring constant so that the spring constant is steppingly increased according to the approach of said movable plate to said electromagnetic actuator so as to perform a non-linear characteristic.

9. A vibration insulating device as claimed in claim 1, wherein said elastic plate generates spring force which is greater than an attractive force generated by said electromagnetic actuator when said movable plate is at a position where said movable plate is in contact with said electromagnetic actuator.

10. A vibration insulating device as claimed in claim 1, further comprising a characteristic varying device that varies a relationship between the displacement amount and the spring constant of said elastic plate.

11. A vibration insulating device as claimed in claim 10, wherein said characteristic varying means includes a piezoelectric element.

12. A vibration insulating device as claimed in claim 10, wherein said characteristic varying means includes a magnetostrictive element.

13. A vibration insulating device as claimed in claim 1, further comprising an auxiliary fluid chamber in fluid communication with said main fluid chamber through an orifice and having a variable volume, said main fluid chamber, said auxiliary fluid chamber, and the orifice containing said fluid.

14. A vibration insulating device as claimed in claim 4, further comprising an outer cylinder partly defining said main fluid chamber and including a flange portion, wherein the holding member includes a flange portion and the elastic plate is disposed directly between the flange portions of the outer cylinder and the holding member.

\* \* \* \* \*